US006950534B2

(12) United States Patent
Cohen et al.

(10) Patent No.: US 6,950,534 B2
(45) Date of Patent: Sep. 27, 2005

(54) GESTURE-CONTROLLED INTERFACES FOR SELF-SERVICE MACHINES AND OTHER APPLICATIONS

(75) Inventors: Charles J. Cohen, Ann Arbor, MI (US); Glenn Beach, Brooklyn, MI (US); Brook Cavell, Ann Arbor, MI (US); Gene Foulk, Ann Arbor, MI (US); Charles J. Jacobus, Ann Arbor, MI (US); Jay Obermark, Ann Arbor, MI (US); George Paul, Bedford, NH (US)

(73) Assignee: Cybernet Systems Corporation, Ann Arbor, MI (US)

( * ) Notice: Subject to any disclaimer, the term of this patent is extended or adjusted under 35 U.S.C. 154(b) by 0 days.

(21) Appl. No.: 10/759,459

(22) Filed: Jan. 16, 2004

(65) Prior Publication Data

US 2004/0161132 A1 Aug. 19, 2004

Related U.S. Application Data

(63) Continuation-in-part of application No. 09/371,460, filed on Aug. 10, 1999, now Pat. No. 6,681,031.
(60) Provisional application No. 60/096,126, filed on Aug. 10, 1998.

(51) Int. Cl.[7] ................................................ G06K 9/00
(52) U.S. Cl. ...................................... 382/103; 382/276
(58) Field of Search .............................. 382/103, 117, 382/118, 153, 171–173, 190–192, 209, 219, 276, 277, 280, 281, 248, 302, 107, 159, 165, 170; 348/147, 169, 171–172; 345/156, 473, 474, 903, 157, 159, 650, 661, 700, 863; 701/45; 715/523, 863

(56) References Cited

U.S. PATENT DOCUMENTS

| 5,047,952 A | | 9/1991 | Kramer et al. ........... 364/513.5 |
| 5,423,554 A | | 6/1995 | Davis ......................... 273/437 |
| 5,454,043 A | * | 9/1995 | Freeman ..................... 382/168 |
| 5,481,454 A | | 1/1996 | Inoue et al. ................ 364/419 |

(Continued)

OTHER PUBLICATIONS

U.S. Air force Instruction, "Aircraft Cockpit and Formation Flight Signals," May 1994.

(Continued)

*Primary Examiner*—Kanjibrai Patel
*Assistant Examiner*—Abolfazl Tabatabai
(74) *Attorney, Agent, or Firm*—Gifford, Krass, Groh, Sprinkle, Anderson & Citkowski, PC

(57) ABSTRACT

A gesture recognition interface for use in controlling self-service machines and other devices is disclosed. A gesture is defined as motions and kinematic poses generated by humans, animals, or machines. Specific body features are tracked, and static and motion gestures are interpreted. Motion gestures are defined as a family of parametrically delimited oscillatory motions, modeled as a linear-in-parameters dynamic system with added geometric constraints to allow for real-time recognition using a small amount of memory and processing time. A linear least squares method is preferably used to determine the parameters which represent each gesture. Feature position measure is used in conjunction with a bank of predictor bins seeded with the gesture parameters, and the system determines which bin best fits the observed motion. Recognizing static pose gestures is preferably performed by localizing the body/object from the rest of the image, describing that object, and identifying that description. The disclosure details methods for gesture recognition, as well as the overall architecture for using gesture recognition to control of devices, including self-service machines.

2 Claims, 19 Drawing Sheets

Signal Flow Diagram of the Gesture Recognition System.

U.S. PATENT DOCUMENTS

| | | | | |
|---|---|---|---|---|
| 5,544,050 A | | 8/1996 | Abe et al. .................... | 364/419 |
| 5,563,988 A | | 10/1996 | Maes et al. ................. | 395/121 |
| 5,570,301 A | | 10/1996 | Barrus ........................ | 364/559 |
| 5,581,276 A | * | 12/1996 | Cipolla et al. .............. | 345/156 |
| 5,594,469 A | | 1/1997 | Freeman ..................... | 345/158 |
| 5,612,719 A | | 3/1997 | Beernink et al. ........... | 345/173 |
| 5,652,849 A | | 7/1997 | Conway et al. ............. | 395/327 |
| 5,659,764 A | | 8/1997 | Sakiyama et al. .......... | 395/753 |
| 5,668,573 A | | 9/1997 | Favot et al. ................ | 345/156 |
| 5,670,987 A | | 9/1997 | Doi et al. ................... | 345/156 |
| 5,696,892 A | * | 12/1997 | Redmann et al. ........... | 345/582 |
| 5,699,441 A | | 12/1997 | Sagawa et al. ............. | 382/100 |
| 5,710,833 A | | 1/1998 | Moghaddam et al. ....... | 382/228 |
| 5,714,698 A | | 2/1998 | Tokioka et al. ............ | 73/865.4 |
| 5,732,227 A | | 3/1998 | Kuzunuki et al. .......... | 395/333 |
| 5,757,360 A | | 5/1998 | Nitta et al. ................. | 345/156 |
| 5,759,044 A | | 6/1998 | Redmond ............... | 434/307 R |
| 5,767,842 A | | 6/1998 | Korth ......................... | 345/168 |
| 5,798,758 A | | 8/1998 | Harada et al. .............. | 345/339 |
| 5,801,704 A | | 9/1998 | Oohara et al. .............. | 345/358 |
| 5,813,406 A | | 9/1998 | Kramer et al. .............. | 128/782 |
| 5,828,779 A | | 10/1998 | Maggioni .................... | 382/165 |
| 5,864,808 A | | 1/1999 | Ando et al. ................. | 704/251 |
| 5,864,848 A | | 1/1999 | Horvitz et al. ................. | 707/6 |
| 5,875,257 A | | 2/1999 | Marrin et al. ............... | 382/107 |
| 5,880,411 A | | 3/1999 | Gillespie et al. ......... | 178/18.01 |
| 5,887,069 A | | 3/1999 | Sakou et al. ................ | 382/100 |
| 5,889,236 A | | 3/1999 | Gillespie et al. ......... | 178/18.01 |
| 5,889,523 A | | 3/1999 | Wilcox et al. .............. | 345/357 |
| 5,898,434 A | | 4/1999 | Small et al. ................. | 345/348 |
| 5,901,246 A | | 5/1999 | Hoffberg et al. ............ | 382/209 |
| 5,903,229 A | | 5/1999 | Kishi .......................... | 341/20 |
| 5,907,328 A | | 5/1999 | Brush II et al. ............ | 345/358 |
| 5,907,852 A | | 5/1999 | Yamada ...................... | 707/541 |
| 5,917,490 A | | 6/1999 | Kuzunuki et al. .......... | 345/351 |
| 5,990,865 A | * | 11/1999 | Gard .......................... | 345/156 |
| 6,035,053 A | | 3/2000 | Yoshioka et al. ........... | 345/351 |
| 6,061,055 A | * | 5/2000 | Marks ........................ | 382/276 |
| 6,137,908 A | | 10/2000 | Rhee .......................... | 382/187 |
| 6,144,366 A | * | 11/2000 | Numazaki et al. .......... | 345/156 |
| 6,219,032 B1 | * | 4/2001 | Rosenberg et al. ......... | 345/157 |
| 6,272,231 B1 | | 8/2001 | Maurer et al. .............. | 382/103 |
| 6,301,370 B1 | | 10/2001 | Steffens et al. ............. | 382/103 |
| 6,335,977 B1 | | 1/2002 | Kage .......................... | 382/107 |
| 6,456,728 B1 | * | 9/2002 | Doi et al. .................... | 382/103 |
| 6,804,396 B2 | * | 10/2004 | Higaki et al. ............... | 382/181 |

OTHER PUBLICATIONS

U.S. Army Field Manual No. 21–60, Washington, D.C., Sep. 30, 1987.

Arnold, V.L., "Ordinary Differential Equations," MIT Press, 1978.

Cohen, C., "Dynamical System Representation, Generation and Recognition of Basic Oscillatory Motion Gestures and Applications for the Control of Actuated Mechanisms," Ph.D. Dissertation, Univ. of Michigan, 1996.

Frank, D., "HUD Expands Kiosk Program," Federal Computer Week, Mar. 8, 1999.

Hager, G., Chang, W., Morse, A.; "Robot Feedback Control Based on Stereo Vision: Towards Calibration–Free HandEye Coordination," IEEE Int. Conf. Robotics and Automation, San Diego, CA, May 1994.

Hauptmann, A., "Speech and Gestures for Graphic Image Manipulation," Computer Human Interaction 1989 Proc., pp. 241–245, May 1989.

Hirsch, M. Smale, S., "Differential Equations, Dynamical Systems and Linear Algebra," Academic Press, Orlando, FL, 1974.

Kanade, T., "Computer Recognition of Human Faces," Birkhauser Verlag, Basel and Stuttgart, 1977.

Karon, P., "Beating an Electronic Pathway to Government with Online Kiosks," Los Angeles Times, Aug. 25, 1996.

Link–Belt Construction Equipment Co., "Operating Safety: Crames & Excavators," 1987.

Turk, M., Pentland, A, "Eigenfaces for Recognition," Journal of Cognitive Neuroscience, 3, 1, 71–86, 1991.

Narendra, K. Baiakrishnan, J. "Improving Transient Response to Adaptive. Control Systems Using Multiple Models and Switching," IEEE Trans. on Automatic Control, 39:1861–1866, Sep. 1994.

Rizzi, A., Whitecomb, L., Koditschek, D.; "Distributed Real–Time Control of a Spatial Robot Juggler," IEEE Computer, 25(5) May 1992.

Wolf, C., Morrel–Samuels, P., "The use of hand–drawn gesetures for text editing," Int. Journ. of Man–Machine Studies, vol. 27, pp. 91–102, 1987.

Wolf, C., Rhyne, J., "A Taxonomic Approach to Understanding Direct Manipulation," Jour. of the Human Factors Society 31th Annual Meeting, pp. 576–580.

Yuille, A., "Deformable Templates for Face Recognition," Journ. of Cognitive Neuroscience, 3, 1, 59–70, 1991.

C. Cohen, G. Beach, G. Paul, J. Obermark, G. Foulk, "Issues of Controlling Public Kiosks and other Self Service Machines using Gesture Recognition," Oct. 1998.

L. Conway, C. Cohen, "Video Mirroring and Iconic Gestures: Enhancing Basic Videophones to Provide Visual Coaching and Visual Control", no date available.

C. Cohen, L. Conway, D. Koditschek, G. Roston, "Dynamic System Representation of Basic and Non–Linear in Parameters Oscillatory Motion Gestures," Oct. 1997.

C. Cohen, L. Conway, D. Koditschek, "Dynamic System Representation, Generation, and Recognition of Basic Oscillatory Motion Gestures," Oct. 1996.

C. Cohen, G. Beach, B. Cavell, G. Foulk, J. Obermark, G. Paul, "The Control of Self Service Machines Using Gesture Recognition," (Aug. 1999).

* cited by examiner

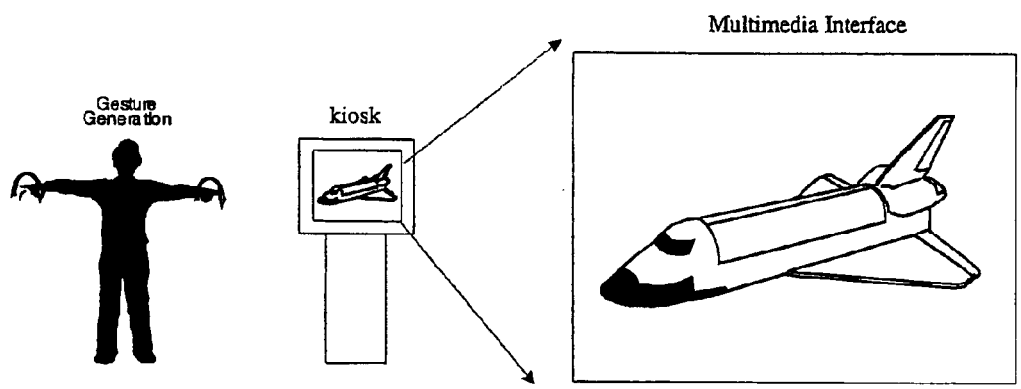
Figure 1: Gesture Recognition System.
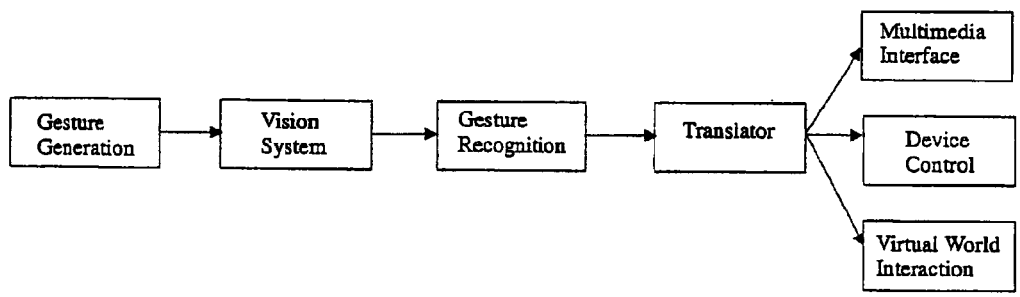
Figure 2: Gesture Recognition System Flow Chart.

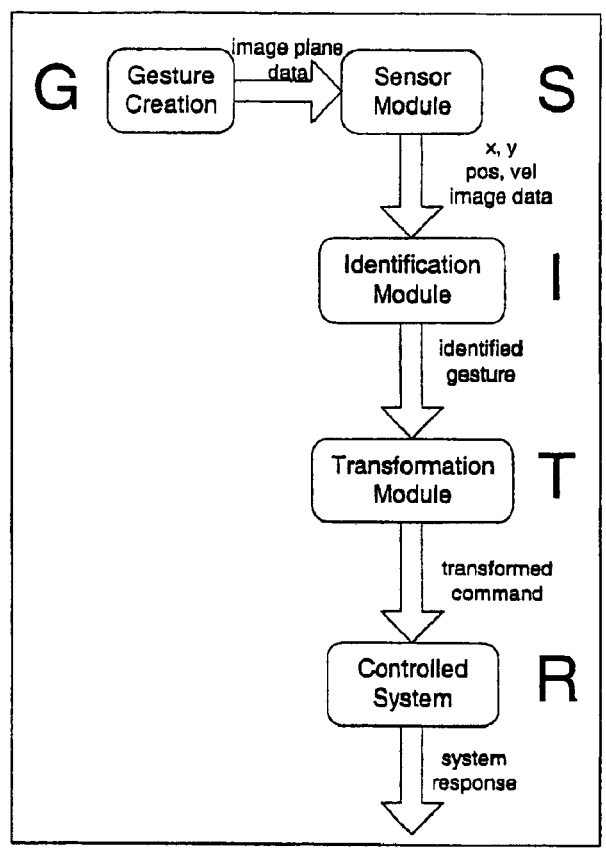
Figure 3: Signal Flow Diagram of the Gesture Recognition System.

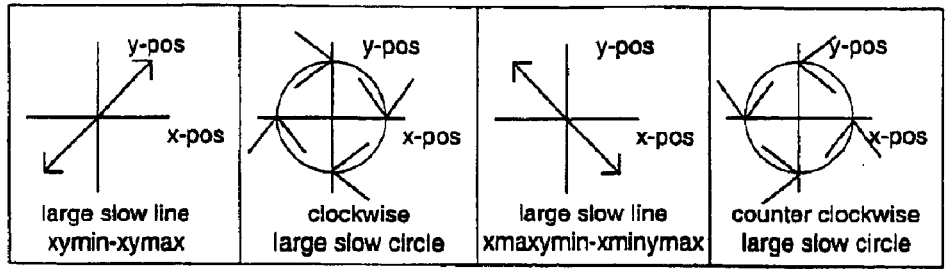
Figure 4: Example gestures, showed in two dimensions.
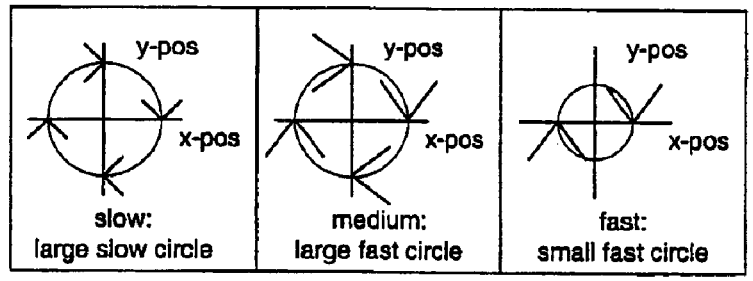
Figure 5: Three Example Gestures.

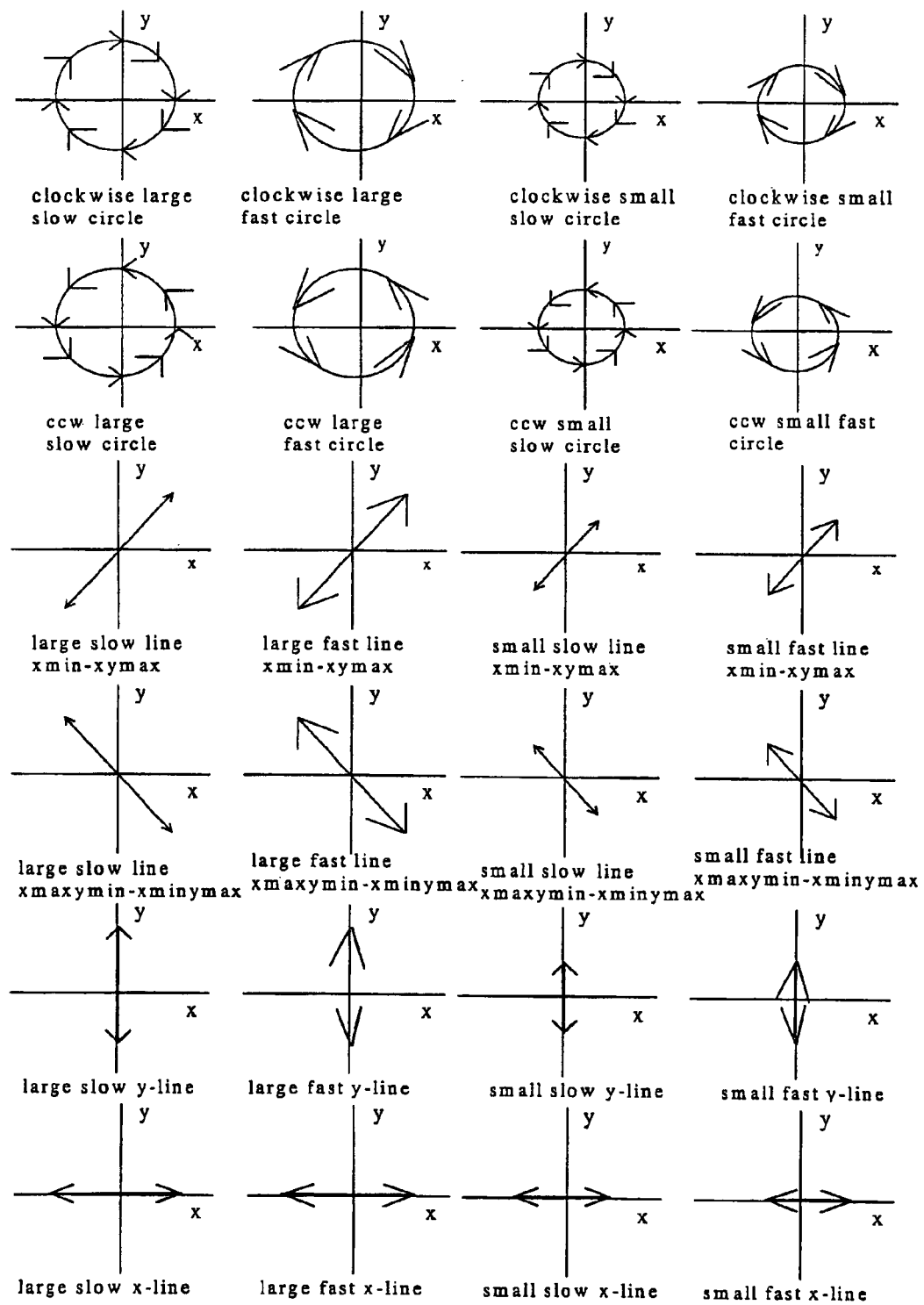
Figure 6: An Example 24 Gesture Lexicon.

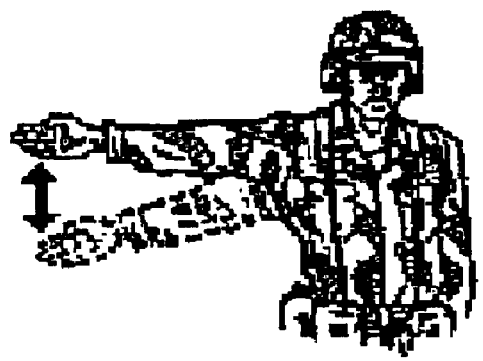
Figure 7: Slow Down Gesture.
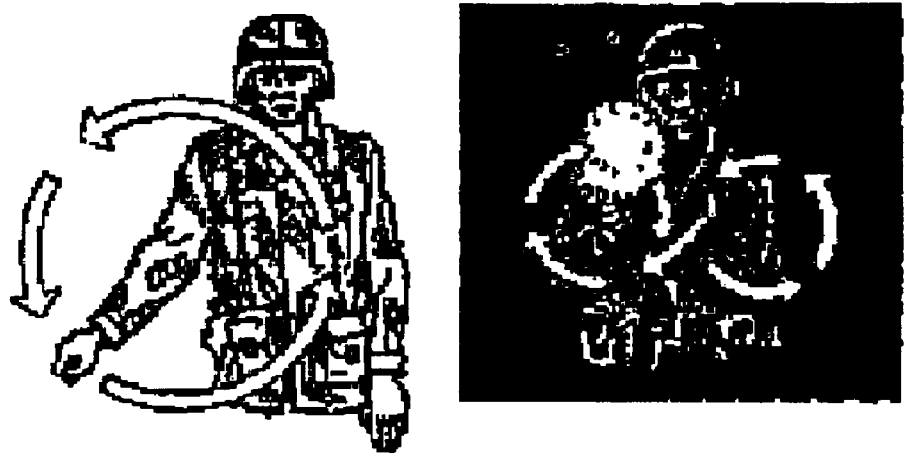
Figure 8: Prepare to Move Gesture.

Figure 9: Attention Gesture.

Figure 10: Stop Gesture.
Figure 11: Right or Left Turn Gestures.
Figure 12: "Okay" Gesture.

Figure 13: Freeze Gesture.
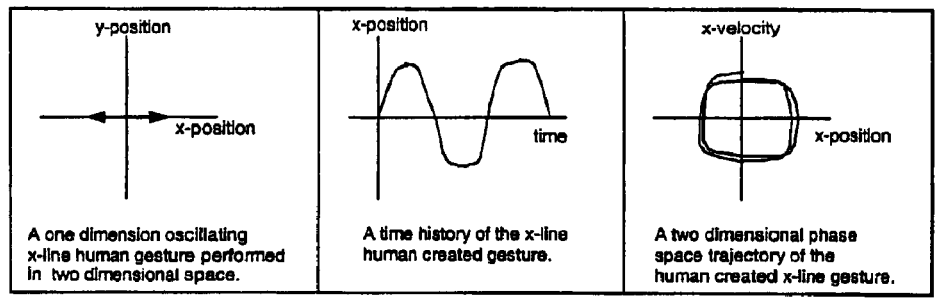
Figure 14: Plots of a Human Created One Dimensional X-Line Oscillating Motion.
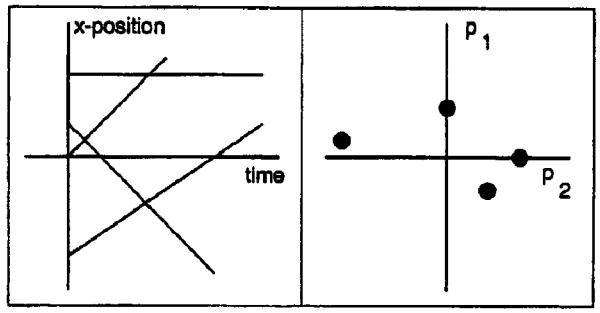
Figure 15: Possible Lines Associated with x(t,p)=p0+p1t and Their Equivalent Representation in the p Parameter Space.

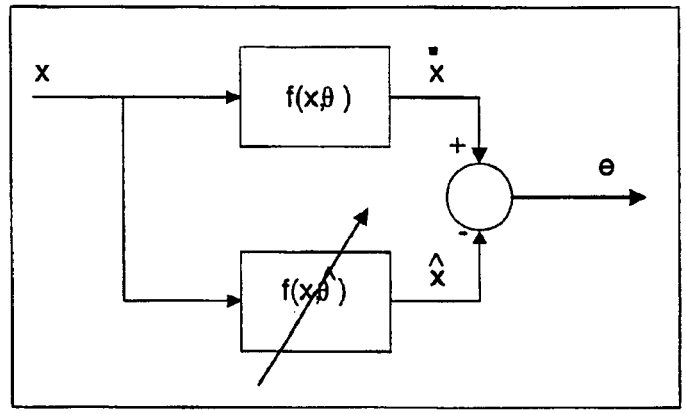
Figure 16: Parameter Fitting: We Require a Rule for q to Bring the Error to Zero.
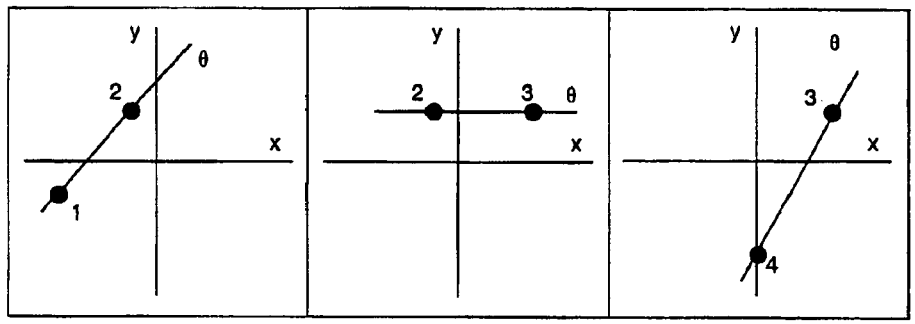
Figure 17: Plots of Different (xi,yi) Data Points that Result in a Different Best Fitting q Line.

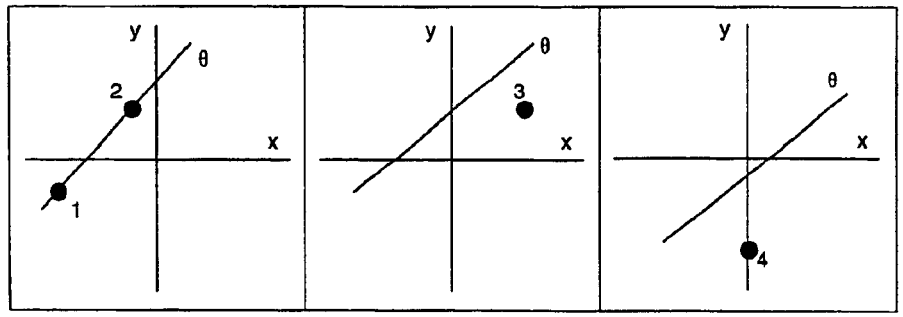
Figure 18: The Recursive Linear Least Squares Method for Updating q with Each Additional (xi,yi) Data Point.
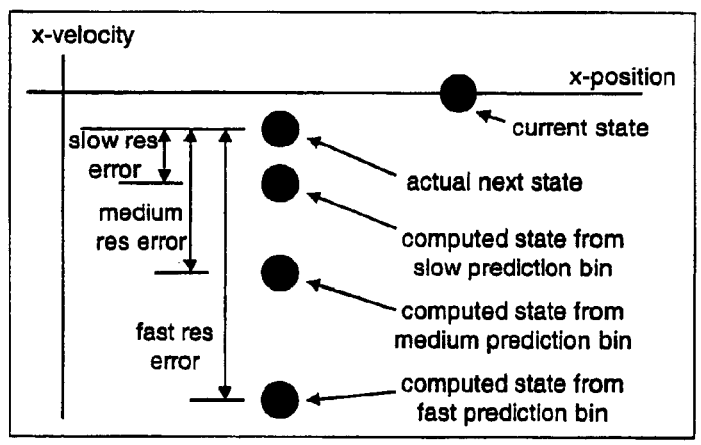
Figure 19: An Exaggerated Representation of the Residual Error Measurement.

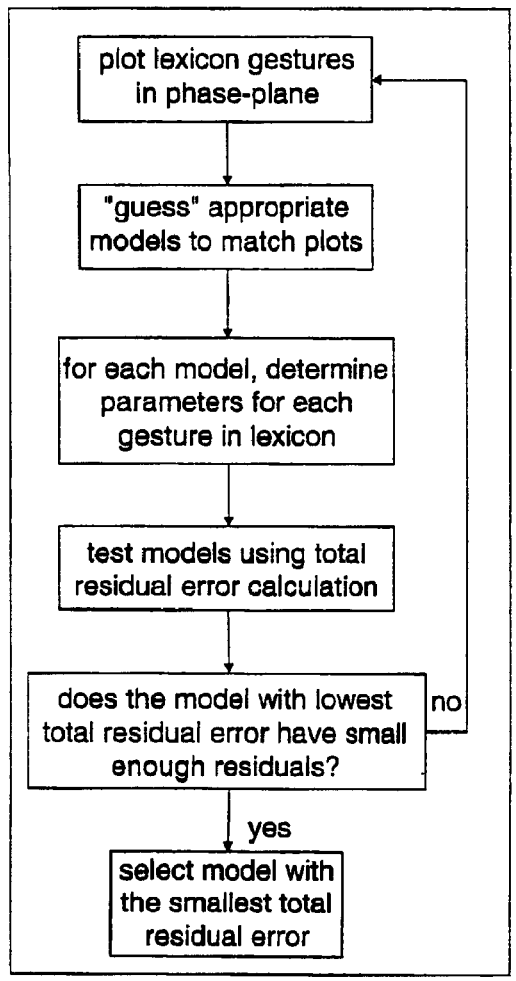
Figure 20: An Algorithm for Determining the Specific Gesture Model.

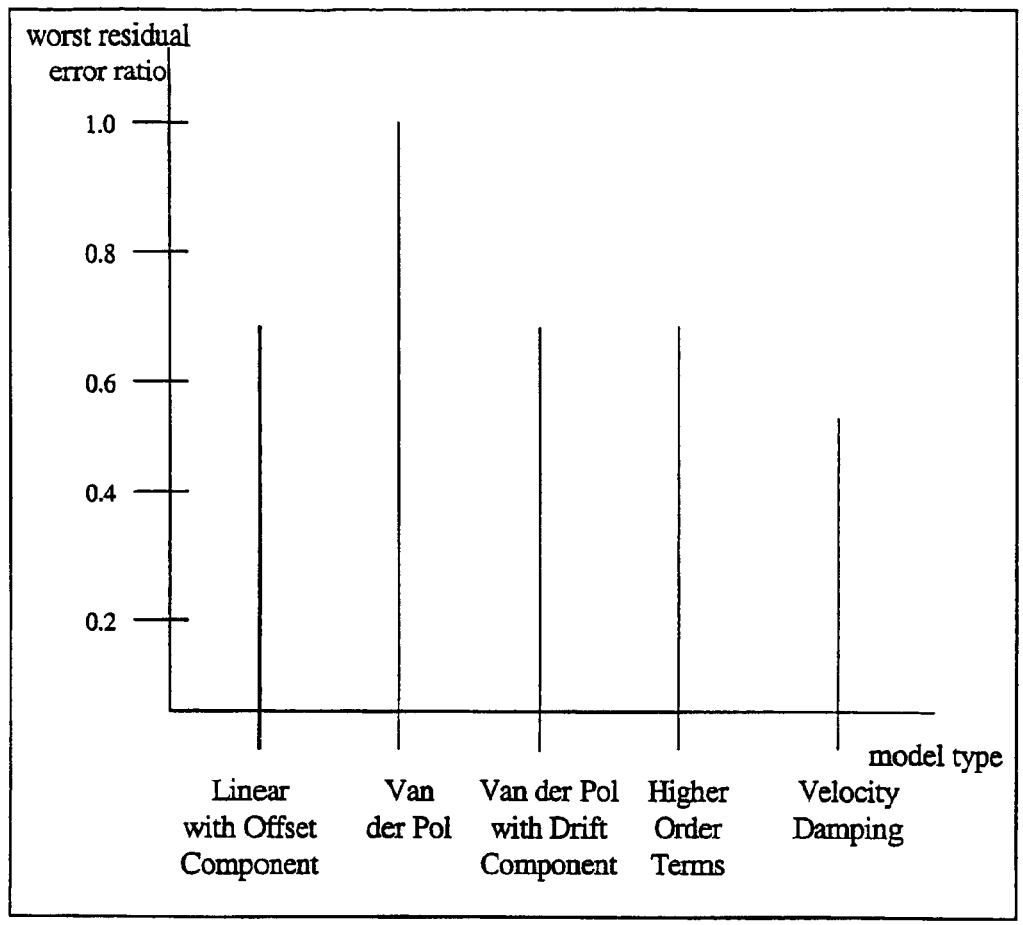
Figure 21: The Worst Case Residual Ratios for Each Gesture Model. The Lower the Ratio, the Better the Model.

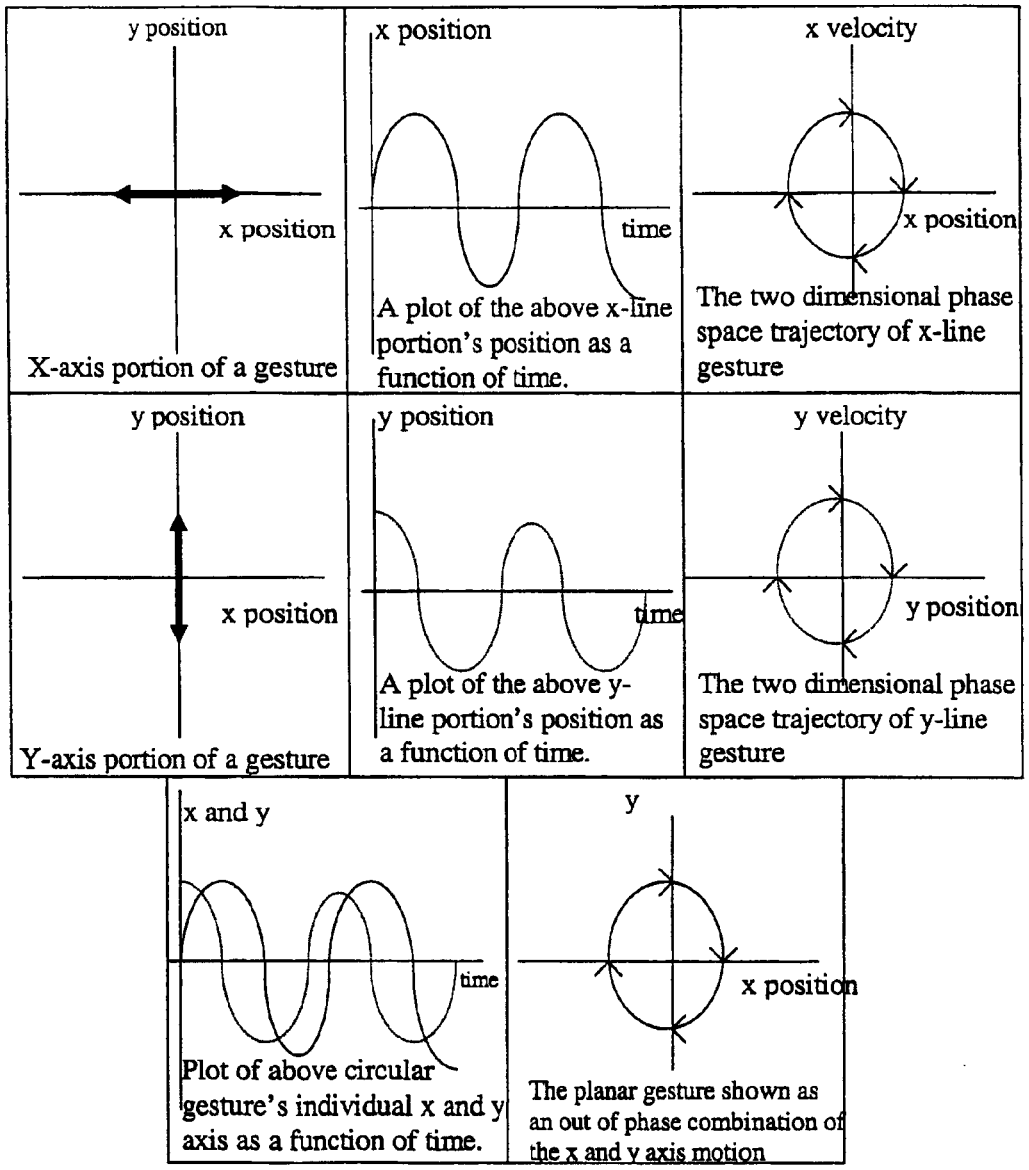
Figure 22: Two Perpendicular Oscillatory Line Motions Combined into a Circular Gesture.

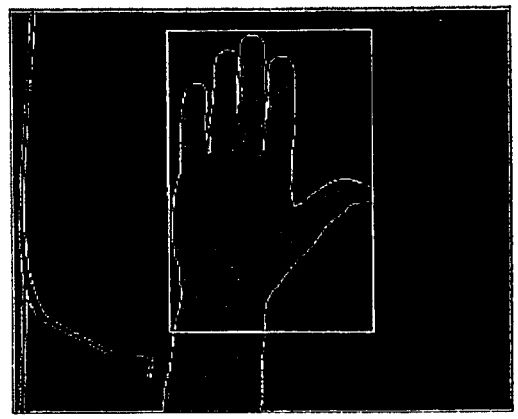
Figure 23: Bounding Box Around Hand.
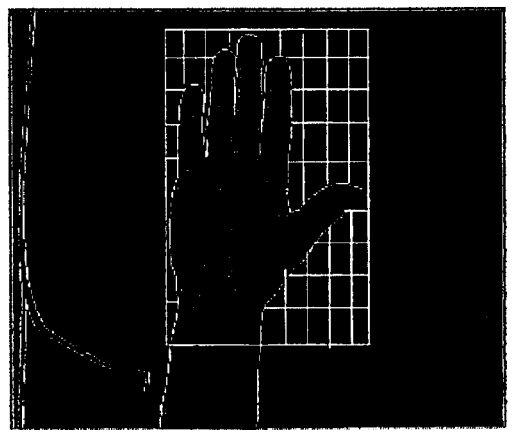
Figure 24: Descriptions from Bounding Box.

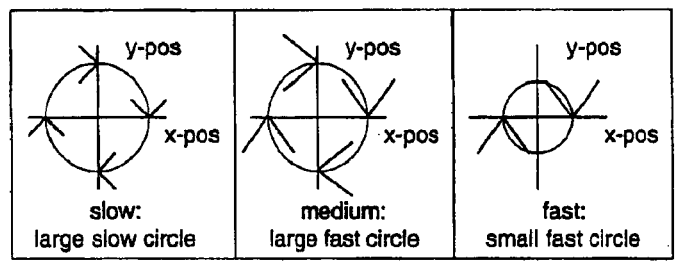
Figure 25: The Example Gestures.
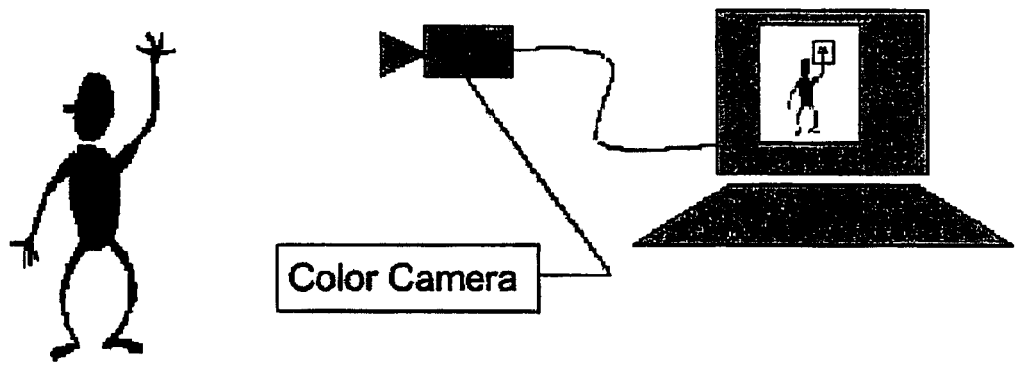
Figure 26: Schematic of the Hand Tracking System Hardware.

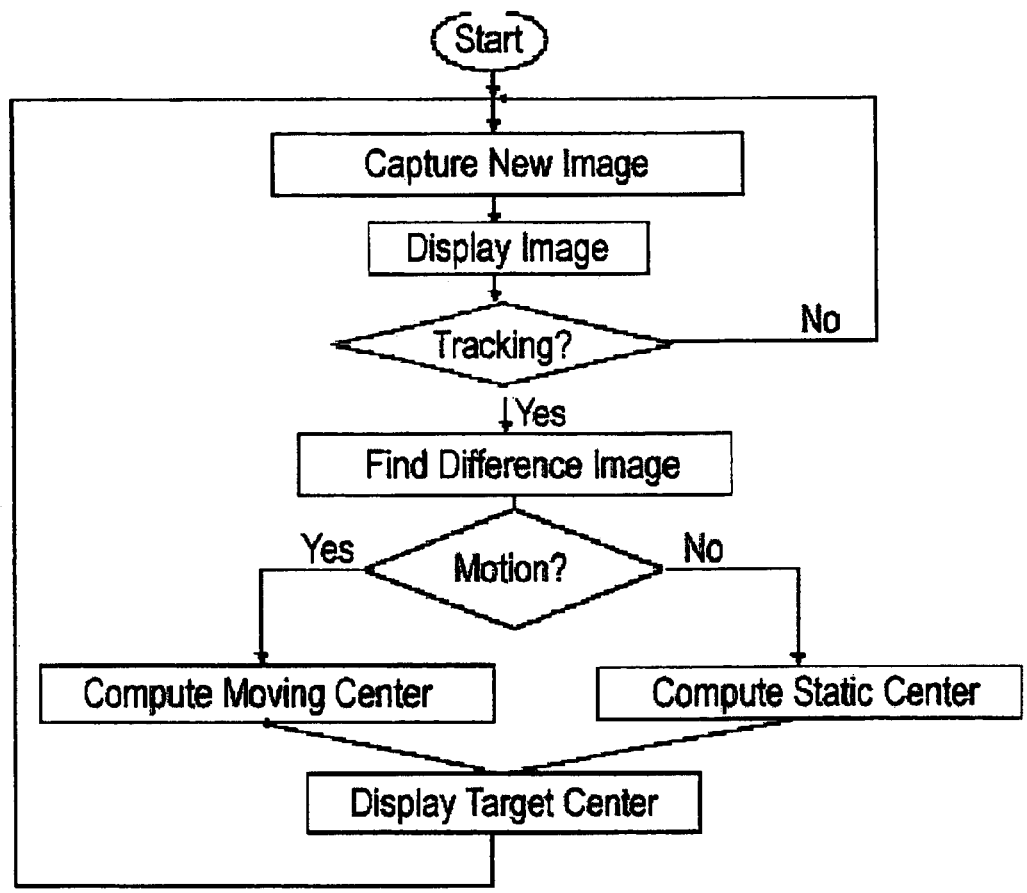
Figure 27: Flowchart of the CTS.

Figure 28: Graphical User Interface of the CTS.

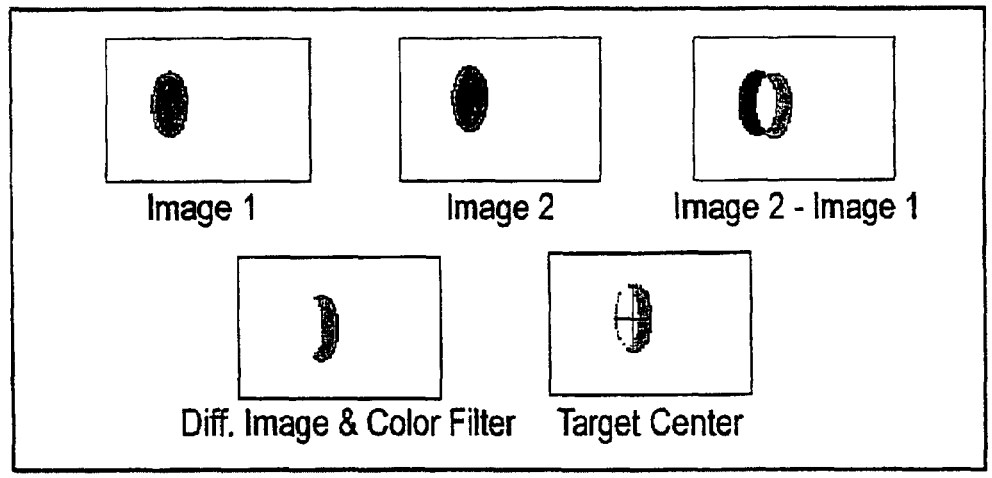
Figure 29: Target Center from Difference Image.
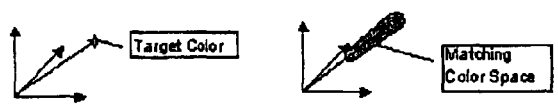
Figure 30: Color Matching Technique.
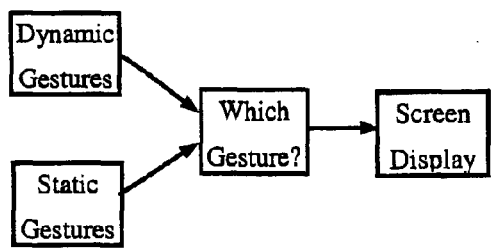
Figure 31: Identification Module.

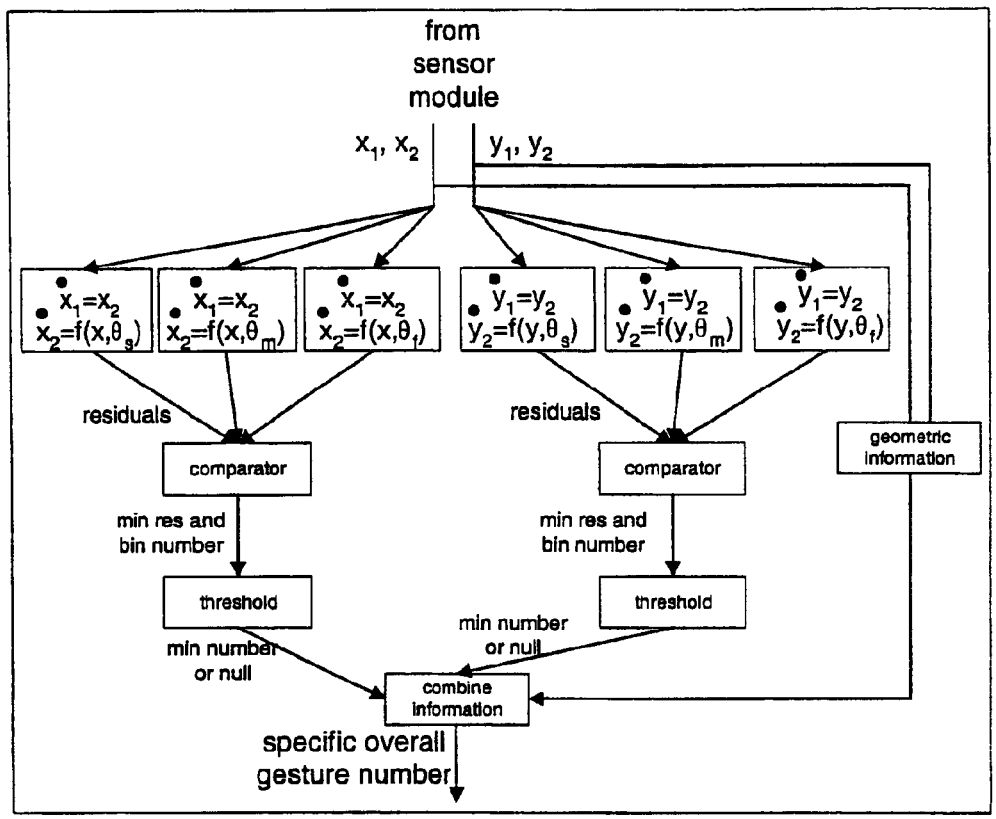
Figure 32: Simplified Diagram of the Dynamic Gesture Prediction Module.

GESTURE-CONTROLLED INTERFACES FOR SELF-SERVICE MACHINES AND OTHER APPLICATIONS

REFERENCE TO RELATED APPLICATIONS

This application is a continuation-in-part of U.S. patent application Ser. No. 09/371,460, filed Aug. 10, 1999, now U.S. Pat. No. 6,681,031, which claims priority of U.S. provisional patent application Ser. No. 60/096,126, filed Aug. 10, 1998, the entire contents of which are incorporated here by reference.

FIELD OF THE INVENTION

This invention relates to person-machine interfaces and, in particular, to gesture-controlled interfaces for self-service machines and other applications.

BACKGROUND OF THE INVENTION

Gesture recognition has many advantages over other input means, such as the keyboard, mouse, speech recognition, and touch screen. The keyboard is a very open ended input device and assumes that the user has at least a basic typing proficiency. The keyboard and mouse both contain moving parts. Therefore, extended use will lead to decreased performance as the device wears down. The keyboard, mouse, and touch screen all need direct physical contact between the user and the input device, which could cause the system performance to degrade as these contacts are exposed to the environment. Furthermore, there is the potential for abuse and damage from vandalism to any tactile interface which is exposed to the public.

Tactile interfaces can also lead hygiene problems, in that the system may become unsanitary or unattractive to users, or performance may suffer. These effects would greatly diminish the usefulness of systems designed to target a wide range of users, such as advertising kiosks open to the general public. This cleanliness issue is very important for the touch screen, where the input device and the display are the same device. Therefore, when the input device is soiled, the effectiveness of the input and display decreases. Speech recognition is very limited in a noisy environment, such as sports arenas, convention halls, or even city streets. Speech recognition is also of limited use in situations where silence is crucial, such as certain military missions or library card catalog rooms.

Gesture recognition systems do not suffer from the problems listed above. There are no moving parts, so device wear is not an issue. Cameras, used to detect features for gesture recognition, can easily be built to withstand the elements and stress, and can also be made very small and used in a wider variety of locations. In a gesture system, there is no direct contact between the user and the device, so there is no hygiene problem. The gesture system requires no sound to be made or detected, so background noise level is not a factor. A gesture recognition system can control a number of devices through the implementation of a set of intuitive gestures. The gestures recognized by the system would be designed to be those that seem natural to users, thereby decreasing the learning time required. The system can also provide users with symbol pictures of useful gestures similar to those normally used in American Sign Language books. Simple tests can then be used to determine what gestures are truly intuitive for any given application.

For certain types of devices, gesture inputs are the more practical and intuitive choice. For example, when controlling a mobile robot, basic commands such as "come here", "go there", "increase speed", "decrease speed" would be most efficiently expressed in the form of gestures. Certain environments gain a practical benefit from using gestures. For example, certain military operations have situations where keyboards would be awkward to carry, or where silence is essential to mission success. In such situations, gestures might be the most effective and safe form of input.

A system using gesture recognition would be ideal as input devices for self-service machines (SSMs) such as public information kiosks and ticket dispensers. SSMs are rugged and secure cases approximately the size of a phone booth that contain a number of computer peripheral technologies to collect and dispense information and services. A typical SSM system includes a processor, input device(s) (including those listed above), and video display. Many SSMs also contain a magnetic card reader, image/document scanner, and printer/form dispenser. The SSM system may or may not be connected to a host system or even the Internet.

The purpose of SSMs is to provide information without the traditional constraints of traveling to the source of information and being frustrated by limited manned office hours or to dispense objects. One SSM can host several different applications providing access to a number of information/service providers. Eventually, SSMs could be the solution for providing access to the information contained on the World Wide Web to the majority of a population which currently has no means of accessing the Internet.

SSMs are based on PC technology and have a great deal of flexibility in gathering and providing information. In the next two years SSMs can be expected to follow the technology and price trends of PC's. As processors become faster and storage becomes cheaper, the capabilities of SSMs will also increase.

Currently SSMs are being used by corporations, governments, and colleges. Corporations use them for many purposes, such as displaying advertising (e.g. previews for a new movie), selling products (e.g. movie tickets and refreshments), and providing in-store directories. SSMs are deployed performing a variety of functions for federal, state, and municipal governments. These include providing motor vehicle registration, gift registries, employment information, near-real time traffic data, information about available services, and tourism/special event information. Colleges use SSMs to display information about courses and campus life, including maps of the campus.

SUMMARY OF THE INVENTION

The subject invention resides in gesture recognition methods and apparatus. In the preferred embodiment, a gesture recognition system according to the invention is engineered for device control, and not as a human communication language. That is, the apparatus preferably recognizes commands for the expressed purpose of controlling a device such as a self-service machine, regardless of whether the gestures originated from a live or inanimate source. The system preferably not only recognizes static symbols, but dynamic gestures as well, since motion gestures are typically able to convey more information.

In terms of apparatus, a system according to the invention is preferably modular, and includes a gesture generator, sensing system, modules for identification and transformation in to a command, and a device response unit. At a high level, the flow of the system is as follows. Within the field of view of one or more standard video cameras, a gesture is made by a person or device. During the gesture making process, a video image is captured, producing image data along with timing information. As the image data is produced, a feature-tracking algorithm is implemented which outputs position and time information. This position information is processed by static and dynamic gesture recognition algorithms. When the gesture is recognized, a command message corresponding to that gesture type is sent to the device to be controlled, which then performs the appropriate response.

The system only searches for static gestures when the motion is very slow (i.e. the norm of the x and y—and z—velocities is below a threshold amount). When this occurs, the system continually identifies a static gesture or outputs that no gesture was found. Static gestures are represented as geometric templates for commonly used commands such as Halt, Left/Right Turn, "OK," and Freeze. Language gestures, such as the American Sign Language, can also be recognized. A file of recognized gestures, which lists named gestures along with their vector descriptions, is loaded in the initialization of the system. Static gesture recognition is then performed by identifying each new description. A simple nearest neighbor metric is preferably used to choose an identification. In recognizing static human hand gestures, the image of the hand is preferably localized from the rest of the image to permit identification and classification. The edges of the image are preferably found with a Sobel operator. A box which tightly encloses the hand is also located to assist in the identification.

Dynamic (circular and skew) gestures are preferably treated as one-dimensional oscillatory motions. Recognition of higher-dimensional motions is achieved by independently recognizing multiple, simultaneously created one-dimensional motions. A circle, for example, is created by combining repeating motions in two dimensions that have the same magnitude and frequency of oscillation, but wherein the individual motions ninety degrees out of phase. A diagonal line is another example. Distinct circular gestures are defined in terms of their frequency rate; that is, slow, medium, and fast.

Additional dynamic gestures are derived by varying phase relationships. During the analysis of a particular gesture, the x and y minimum and maximum image plane positions are computed. Z position is computed if the system is set up for three dimensions. If the x and y motions are out of phase, as in a circle, then when x or y is minimum or maximum, the velocity along the other is large. The direction (clockwiseness in two dimensions) of the motion is determined by looking at the sign of this velocity component. Similarly, if the x and y motion are in phase, then at these extremum points both velocities are small. Using clockwise and counter-clockwise circles, diagonal lines, one-dimensional lines, and small and large circles and lines, a twenty-four gesture lexicon was developed and described herein. A similar method is used when the gesture is performed in three dimensions.

An important aspect of the invention is the use of parameterization and predictor bins to determine a gesture's future position and velocity based upon its current state. The bin predictions are compared to the next position and velocity of each gesture, and the difference between the bin's prediction and the next gesture state is defined as the residual error. According to the invention, a bin predicting the future state of a gesture it represents will exhibit a smaller residual error than a bin predicting the future state of a gesture that it does not represent. For simple dynamic gestures applications, a linear-with-offset-component model is preferably used to discriminate between gestures. For more complex gestures, a variation of a velocity damping model is used.

This invention finds wide utility in a large number of application areas, including map control, home automation, security, home appliances, sports, games, business, automotive, and others. In terms of map control, for example, the maps may be associated with weather, military, automotive (i.e., GPS-based or other navigation systems), nautical, aerial, space, security, and telestrator interactions and control. As one more specific disclosed application, a meteorologist may control the generation, selection, presentation or movement of weather maps, satellite views, and other visuals

BRIEF DESCRIPTION OF THE DRAWINGS

FIG. 1 is a drawing of a gesture recognition system according to the invention;

FIG. 2 is a gesture recognition system flow chart;

FIG. 3 is a signal flow diagram of a gesture recognition system according to the invention;

FIG. 4 is a drawing which shows example gestures in two dimensions;

FIG. 5 shows three example gestures;

FIG. 6 is an example of a 24-gesture lexicon according to the invention;

FIG. 7 depicts a Slow-Down gesture;

FIG. 8 depicts a Move gesture;

FIG. 9 depicts an Attention gesture;

FIG. 10 depicts a Stop gesture;

FIG. 11 shows Right/Left Turn gestures;

FIG. 12 shows an "Okay" gesture;

FIG. 13 shows a Freeze gesture;

FIG. 14 provides three plots of a human created one dimensional X-Line oscillating motion;

FIG. 15 shows possible lines associated with $x(t,p)=p0+p1t$ and their equivalent representation in the p-parameter space;

FIG. 16 illustrates parameter fitting wherein a rule is used for q to bring the error to zero;

FIG. 17 plots different (xi,yi) data points resulting in a different best fitting q line;

FIG. 18 depicts a recursive linear least squares method for updating q with subsequent (xi,yi) data points;

FIG. 19 illustrates an algorithm for determining a specific gesture model according to the invention;

FIG. 20 is an exaggerated representation of a residual error measurement;

FIG. 21 is a plot which shows worst case residual ratios for each gesture model, wherein the lower the ratio, the better the model;

FIG. 22 illustrates how two perpendicular oscillatory line motions may be combined into a circular gesture;

FIG. 23 shows how a bounding box may be placed around a hand associated with a gesture;

FIG. 24 provides descriptions from the bounding box of FIG. 23;

FIG. 25 shows example gestures;

FIG. 26 is a schematic of hand-tracking system hardware according to the invention;

FIG. 27 is a flowchart of a color tracking system (CTS) according to the invention;

FIG. 28 depicts a preferred graphical user interface of the CTS;

FIG. 29 illustrates the application of target center from difference image techniques;

FIG. 30 illustrates a color matching technique;

FIG. 31 is a representation of an identification module; and

FIG. 32 is a simplified diagram of a dynamic gesture prediction module according to the invention.

DETAILED DESCRIPTION OF THE INVENTION

FIG. 1 presents a system overview of a gesture controlled self-service machine system according to the invention. FIG. 2 shows a flow chart representation of how a vision system is views the gesture created, with the image data sent to the gesture recognition module, translated into a response, and then used to control a SSM, including the display of data, a virtual environment, and devices. The gesture recognition system takes the feature positions of the moving body parts (two- or three-dimensional space coordinates, plus a time stamp) as the input as quickly as vision system can output the data and outputs what gesture (if any) was recognized, again at the same rate as the vision system outputs data.

The specific components of the gesture recognition system are detailed in FIG. 3, and these include five modules:
G: Gesture Generation
S: Sensing (vision)
I: Identification Module
T: Transformation
R: Response At a high level, the flow of the system is as follows. Within the field of view of one or more standard video cameras, a gesture is made by a person or device. During the gesture making process, a video capture card is capturing images, producing image data along with timing information. As the image data is produced, they are run through a feature tracking algorithm which outputs position and time information. This position information is processed by static and dynamic gesture recognition algorithms. When the gesture is recognized, a command message corresponding to that gesture type is sent to the device to be controlled, which then performs and appropriate response. The five modules are detailed below.

Gesture Creator

In the Gesture Creator module, a human or device creates a spatial motion to be recognized by the sensor module. If one camera is used, then the motion generated is two dimensional and parallel to the image plane of the monocular vision system. For three dimensional tracking (as is also done with this system), stereo vision using two or more cameras are used.

The subject gesture recognition system is designed to recognize consistent yet non-perfect motion gestures and non-moving static gestures. Therefore, a human can create such gestures, as well as an actuated mechanism which could repeatedly create perfect gestures. Human gestures are more difficult to recognize due to the wide range of motions that humans recognize as the same gesture. We designed our gesture recognition system to recognize simple Lissagous gesture motions (repeating circles and lines), repeated complex motions (such as "come here" and "go away quickly" back and forth hand motions which we define as "skew" gestures), and static hand symbols (such as "thumbs-up").

With regards to human generated gestures used for communication or device control, we chose gestures to be identified based on the following:

Humans should be able to make the gestures easily.
The gestures should be easily represented mathematically.
The lexicon should match useful gestures found in real world environments.

For the dynamic (circular and skew) gestures, these consist of one-dimensional oscillations, performed simultaneously in two or three dimensions. A circle is such a motion, created by combining repeating motions in two dimensions that have the same magnitude and frequency of oscillation, but with the individual motions ninety degrees out of phase. A "diagonal" line is another such motion. We have defined three distinct circular gestures in terms of their frequency rates: slow, medium, and fast. An example set of such gestures is shown in FIG. 4. These gestures can also be performed in three dimensions, and such more complex motions can be identified by this system.

The dynamic gestures are represented by a second order equation, one for each axis:

$$\dot{x}_1 = x_2$$

$$\dot{x}_2 = \theta_1 x_1 + \theta_2$$

More complex second-order models are used to recognize more complex gestures (discussed later). This gesture model has no "size" parameter. $\theta_1$ is a frequency measure, and $\theta_2$ is a drift component. The gestures were named "large", "small", "fast", and "slow" due to the human motions used to determine the parameters (see FIG. 5). A fast small circle is used to represent a fast oscillation because humans can not make fast oscillations using large circles.

For example, a total of 24 gestures are possible when the following are distinct gestures: clockwise and counter-clockwise circles, diagonal lines, one dimensional lines, and small and large circles and lines. Geometric constraints are required to expand the lexicon, because different gestures can result in the same parameters. FIG. 6 shows motions that would cause an identifier to produce the same frequency measure and drift components as it would produce when identifying a slow large circle. When x and y oscillating motions are 90 degrees out of phase, a clockwise circle is produced. Motions that are 270 degrees out of phase result in a counter-clockwise circle. In-phase motions produce a line with a positive slope. When the motions are 180 degrees out of phase, a line with a negative slope is produced. We can create additional gestures from the fast small circle in the same manner.

As with the previous gestures, additional gestures can be created from these two gestures by varying the phase relationships. FIG. 6 shows a representation of the 24 gestures in possible lexicon. Even more gestures are possible when the third dimension is used.

Phase relationships are determined as follows. During the gesture, the x's and y's (and z's, if the system is set up for three dimensions) minimum and maximum image plane positions are computed. If the x and y motions are out of phase, as in a circle, then when x or y is minimum or maximum, the other axis' velocity is large. The direction (clockwiseness in two dimensions) of the motion is determined by looking at the sign of this velocity component. Similarly, if the x and y motion are in phase, then at these extremum points both velocities are small.

Example dynamic gestures used for real world situations were derived from a standard Army Training Manual. A "Slow Down" gesture is a small x-line created to one side of the body (FIG. 7, left side). A "Day Move" gesture is a counterclockwise large slow circle (FIG. 8, left side). The "Attention" gesture is a large y-line overhead motion (FIG.

9). These three gestures are representative of the motion gestures used throughout the Army manual.

Static gestures are represented as geometric templates. Four gestures are shown and are representative of the static gestures which can be represented and identified by this gesture recognition system. Additionally, language gestures, such as American Sign Language gestures, can also be recognized.

The example static gestures are:
Halt—stop hand above head (FIG. 10—left side of figure).
Left and Right turn—fingers together, palm out, facing left or right (FIG. 11—left side of figure).
Message Acknowledge (OK)—thumb up (FIG. 12).
Freeze—Fist at head level (FIG. 13).
Identifying Moving Gestures Represented as a Dynamic System.

The gesture recognition system identifies a moving gesture by its dynamics—that is, the structure of its positions in space over time. The system translates the motion information into parameters which are used to develop commands for controlling data outputs and actuated mechanisms. For example, the speed at which a person waves a robot away might directly affect a robot arm's velocity or a mobile robot's speed. In order for recognition to occur, a representation for human gestures is required, from which a computational method for determining and recognizing specific gestures can be derived.

Although we make these gestures in two and three dimensions, the explanation now detailed is described simply dimension as a basic one-dimensional gesture as a simple example to clarify the distinction between the "shape" and the "dynamics" of a gesture. The techniques for identifying this basic gesture may be used to identify similar oscillatory motions occurring in two and three dimensions.

First, a dynamic system gesture representation is determined, both the model for representing the oscillatory gestures and parameter determination scheme was developed. For this system a Linear Least Squares method was an on-line computationally efficient technique which allowed us to use a linear-in-parameters gesture model.

The representative planar gesture used throughout this section to exemplify our method consists of a family of oscillating motions which form a (roughly) horizontal line segment ("x-line motion"). As discussed earlier, a human is incapable of reliably generating a perfect sinusoidal motion. FIG. 14 illustrates the imperfections of a human created x-line motion viewed in three plots. The plots represent the position of the gesture over time, x(t). Viewing position with respect to time in contrast to position and velocity over time provides insight into how we propose to represent gestures. Plot A (leftmost) shows the planar motion in x-position and y-position coordinates, with the gesture's motion constrained to the x-axis. Thus, the "shape" of the motion conveys relatively little information. Plot B (center) shows the same gesture in x-position plotted against time, emphasizing the oscillatory behavior we wish to capture. Plot C (at right) represents the record of x-velocity plotted against x-position over time. We will find it most convenient to represent this motion as it evolves over time in this position versus velocity space, which is called the "phase plane". Of course, when a human creates a gesture, the resulting motion does not translate into the perfect sinusoid of plot B or a perfect circle of plot C. Instead, there is a natural range of variation that we would nevertheless like to associate with the same gesture. This association we find most naturally achievable in phase space.

For this dynamic gesture recognition module, a computationally effective mathematical representation for the gesture plotted in FIG. 14 is required. A general representation for time functions might take the form $$x(t)=?,$$

where "?" would be replaced with some structure based on measurable features which are used to classify the gesture. Of course, there are an infinite number of possible measurable features.

We can make the number of classifications (the "feature space" dimension) finite by restricting the form of the representations. Instead of representing gestures as x(t), the representation might be constrained through the use of a parameter vector, resulting in x(t,p). The feature space dimension is then equivalent to the number of parameters we store. For example, when:

$$x(t,p)=p_0+p_1 t,\ t>0,$$

the only possible gestures that we can represent are lines described by the two parameters slope, $p_1$, and intercept $p_0$ (see FIG. 15).

Even with a finite dimensional representation, each unique motion is represented by its own distinct parameters. However, our intuition about human gestures tells us that certain distinct motions should have the same classification. Consider the x-line oscillating gesture discussed earlier. Whether the gesture starts at the left side of the line or the right side (for example, x(0)=−1 or x(0)=+1), the resulting motions would still be identified by a human as the same gesture. Therefore, another type of representation seems desirable.

Since a human hand forms a gesture, we could imagine a representation in terms of the force exerted by the person's arm muscles. Alternatively, we might imagine representing the gesture as a function of the nerve impulses that travel from the brain to the arm's muscles. However, quite clearly, most of the countless types of such "internal" representations are presently impossible to quantify in any useful manner.

Four hundred years ago, Newton developed a parsimonious representation of physical motions based on their dynamic properties, $$\dot{x}(t)=f(x)$$

A dynamic system is a mathematical model describing the evolution of all possible states in some state space as a function of time. The set of all possible states is a state space. Given an initial state, the set of all subsequent states as it evolves over time is a "trajectory" or "motion". For any initial condition, the future evolution of the states in a trajectory remains within that trajectory (the trajectory is an invariant set). Thus, all that is required to describe a particular spatial motion is the differential equation representation and its initial conditions. We use a deterministic representation, as opposed to a stochastic one, because we believe these oscillatory motions are best represented by sine waves or a sum of exponentials as opposed to characteristics based on statistical properties.

As with the geometric representation, there are an infinite number of gesture classifications of the form $\dot{x}(t)=f(x)$. However, as before, we can choose a vector of tunable parameters to make the number of gesture classifications finite. Such representation has the form:

$$\dot{x}(t)=f(x,\theta)$$

where θ represents the tunable parameters. Fixing the value of θ in a given representation yields a unique set of motions, with different initial conditions, described by $\dot{x}(t)=f(x,\theta)$. Motivated by the way humans interpret gestures, we associate an entire set of motions with one specific gesture. Thus, choosing different values of $\theta$ in a given representation results in a "family" of trajectories sets—a "gesture family." For example, consider a oscillatory line gesture, the motion of which is constrained to the x-axis. This gesture can be represented in the following two-dimensional state space:

$$\dot{x}_1 = x_2$$

$$\dot{x}_2 = \theta_1 x_1$$

where $x_1$ represents the position of the gesture, $x_2$ is its velocity, and $\theta_1$ is a specified negative parameter. For any constant $\theta>0$, all trajectories satisfy $-\theta_1 x_1^2 + x_2^2 = $const as can be seen by direct differentiation.

A specific gesture may be considered as a family of sets of trajectories. A human can start the gesture at any point (initial condition) in its trajectory, and the gesture should still be identified as the same oscillating line.

We represent a given family of gestures (family of sets of trajectories) by a mathematical model which contains a finite number of tunable parameters. A mathematical model described by differential equations, as above, allows the development of a computational scheme that will determine which parameters, the values of $\theta_i$'s, correspond to a specific gesture. The set of all valid parameters is the parameter space. The parameter space defines the family of gestures which can be represented by the model. In order to categorize a finite number of gestures in this family and to permit further variability in the exact motions associated with a particular gesture within this family, we partition the parameter space into a finite number of cells—the "lexicon"—and associate all the parameter values in the same cell with one gesture.

We have derived certain differential equations, composed of state variables and parameters, which intuition suggests may represent human gestures. Such differential equation models can be divided into two types: non-linear-in-parameters (NLIP) and linear-in-parameters (LIP). The two models can be further subdivided into linear-in-state (LIS) and non-linear-in-state (NLIS). It is advantageous to use a NLIP (with NLIS) model because it covers, by definition, a much broader range of systems than an LIP model. However, for reasons to be discussed below, we find it expedient to use a LIP model for our gesture representation.

We have chosen to represent planar oscillatory gestures as a second-order system believing that a model based on the acceleration behavior (physical dynamics) of a system is sufficient to characterize the oscillatory gestures in which we are interested. This system's states are position and velocity. However, the vision system we use to sense gestures yields only position information. Since velocity is not directly measured, then either the parameter identification method could be combined with a technique for observing the velocity, or the velocity could be determined through position differences. In the following section we show techniques for determining gesture parameters both when the velocity state is observed, and when it is obtained through position differences. By examining the utility of each technique, we develop an appropriate form of the gesture model and parameter identification method.

A difficulty with using human created gestures is that the underlying true physical model is unknown. Also, because people cannot precisely recreate even a simple circular gesture, multiple sets of parameters could represent the same gesture. Simulations are used both to determine a viable gesture model and to determine if it is possible to discover appropriate parameters for each gesture despite variations in motion.

We chose to represent motion gestures using dynamic systems. We next determined a model and a method for computing the model's parameters such that the model's parameters will best match an observed gesture motion. FIG. 16 illustrates how the gesture's position is used as an input, with $\hat{\theta}$ representing the unknown parameter values that we wish to match with the "true" parameter values, $\theta$. If these values match, then the error between the true states $x$ and the observed states $\hat{x}$ will go to zero.

Our choice of a model and parameter determination scheme was based on an exploration of the following issues:

Off-line batch techniques versus on-line sequential techniques. We desire our gesture recognition system to identify gestures as they are generated, which requires an on-line technique. Also, the measure of how well a motion matches a gesture's parameters needs to be updated "on-line".

State availability. Using a vision system to sense gestures results in image plane position information. However, we are using a second order system to describe gestures. Therefore, we need both positions and velocities for our residual error measurements (see below). Velocity can be obtained through the use of an estimator or by taking a difference of position measurements. Unfortunately, using differences adds noise to the data, which could make parameter identification difficult.

Data order dependent versus independent (for on-line techniques). Certain on-line techniques will produce different parameter values based on the order the gesture data is presented. Because we define a gesture as a family of trajectories, with each trajectory in the same family equally valid, our method should be data order independent. In particular, different excursions through the same data set should result in the same parameters at the end of the data acquisition phase.

Linear versus Non-Linear. A model is a combination of linear and non-linear states and parameters. Although perfect (non human created) circular oscillatory motions can be described by a linear-in-parameters and linear-in-states model, a human created gesture may require a more complex model. Furthermore, our system can recognize more complex oscillatory motions. Therefore, a method for identifying parameters in a richer non-linear model is needed, because non-linear models can represent a much broader range of motions.

We chose our gesture model and parameter determination scheme as follows. First, we decided to de-emphasize off-line batch techniques in favor of on-line ones for reasons already discussed above. The on-line method needs to be chosen carefully, because there are relatively few cases where it can be guaranteed that the estimated parameters will be equivalent to those resulting from off-line techniques applied to the entire data set as a whole.

Next, in an attempt to use only position data, we examined a Series-Parallel Observer, which provides an estimate of the other unknown state for purely LIS and LIP systems. We were disappointed by this observer because it did not adequately estimate parameters of non-perfect human gestures. Specifically, it was problematic to extend the method to NLIS systems. An on-line gradient descent method was examined, but for presently available methods applicable to NLIP systems, there is no guarantee that the parameters will converge towards their optimal values. Also, the parameters computed via this method are dependent on the order the data is presented. A Linear Least Squares method (LLS) was examined next, which makes use of all the data independent of ordering. The resulting recursive LLS technique work for NLIP models, and, therefore, allow us to examine more flexible and useful gesture models.

The Recursive Linear Least Squares incrementally incorporates new data for determining the parameters which will best fit a set of data points to a given linear model. The recursive LLS method uses a tuning rule for updating the parameter vector θ without inverting a matrix, creating a more computationally efficient LLS algorithm. A tuning rule is required, because each block of data will result in a different set of parameters, as illustrated in FIG. 17. The separate graphs show that each pair of $(x_i, y_i)$ data points results in a different best fitting θ line. A method of incrementally updating the parameter θ is described below. The concept is illustrated in FIG. 18. After the first two data points determine the best fit line, each additional data point slightly adjusts the line to a new best fit. Each new data point will shift the line less and less due to the weighting auxiliary equation in the recursive LLS method. The formulation below describes how the weighting function operates.

The recursive (incremental) Linear Least Squares tuning method proceeds as follows. The tuning rule has the form:

$$\theta_{m+1} = g(x_m, \dot{x}_m, \theta_m)$$

Suppose we have the output data $\dot{x}$ and state data x up to time m, and from this data we have already determined the best parameters θ for the set. From [Cohen 96] we know that at the next time step, with $\dot{x}_{m+1}$ and $x_{m+1}$:

$$\theta_{m+1} = \left(\sum_{k=1}^{m+1} f_k^T f_k\right)^{-1} \sum_{k=1}^{m+1} f_k^T \dot{x}_k$$

Define $R_{m+1} = \sum_{k=0}^{m+1} f_k^T f_k$. Then:

$$R_m = \left(\sum_{k=0}^{m-1} f_k^T f_k\right)^{-1} + f_m^T f_m$$

$$= R_{m-1} + f_m^T f_m$$

which implies:

$$R_{m-1} = R_m - f_m^T f_m$$

Therefore:

$$\theta_{m+1} = R_{m+1}^{-1} \sum_{k=1}^{m+1} f_k^T \dot{x}_k$$

$$= R_{m+1}^{-1} \left(\sum_{k=1}^{m} f_k^T \dot{x}_k + f_{m+1}^T \dot{x}_{m+1}\right)$$

$$= R_{m+1}^{-1} \left(\sum_{k=1}^{m} f_k^T f_k \theta_m + f_{m+1}^T \dot{x}_{m+1}\right)$$

$$= R_{m+1}^{-1} (R_m \theta_m + f_{m+1}^T \dot{x}_{m+1})$$

$$= R_{m+1}^{-1} ((R_{m+1} - f_{m+1}^T f_{m+1}) \theta_m + f_{m+1}^T \dot{x}_{m+1})$$

$$= R_{m+1}^{-1} (R_{m+1} \theta_m - f_{m+1}^T f_{m+1} \theta_m + f_{m+1}^T \dot{x}_{m+1})$$

$$= \theta_m - R_{m+1}^{-1} f_{m+1}^T (f_{m+1} \dot{x}_{m+1} - f_{m+1} \theta_m)$$

This is an update law for the $R_{m+1}$ and $\theta_{m+1}$ terms. We still have to find the inverse of $R_{m+1}$ at each time step. Fortunately, the matrix inversion lemma yields:

$$(R_m + f_m^T f_m)^{-1} = R_m^{-1} - R_m^{-1} f_m^T (f_m R_m^{-1} f_m^T + 1)^{-1} f_m R_m^{-1}$$

Therefore:

$$R_{m+1}^{-1} = (R_m + f_m^T f_m)^{-1}$$

$$= R_m^{-1} - R_m^{-1} f_m^T (f_m R_m^{-1} f_m^T + 1)^{-1} f_m R_m^{-1}$$

The above equation is a recursive formula for $R_{m+1}^{-1}$ that is not based on taking the inverse of a matrix. The initial value of $R_0$ is chosen as the identity matrix. If more importance is attached to recent data than to data received in the remote past, then we can choose $\theta_m$ to minimize:

$$\sum_{k=0}^{m} \lambda^{m-k} (\dot{x}_k - f_k^T f_k)$$

where λ is termed the forgetting factor and is chosen with 0<λ<1. This results in:

$$\theta_{m+1} = \theta_m + R_{m+1}^{-1} f_{m+1}^T (\dot{x}_{m+1} - f_{m+1} \theta_m)$$

$$R_{m+1}^{-1} = \frac{1}{\lambda} R_m^{-1} - \frac{1}{\lambda} R_m^{-1} f_m^T (f_m R_m^{-1} f_m^T + \lambda)^{-1} f_m R_m^{-1}$$

The above recursive equation is the identifier in our gesture recognition system. This identifier allows us to represent gestures using a NLIP model, with the parameters identified using an on-line computationally efficient data order independent technique. We now determine the specific model used to represent oscillatory motion gestures.

Given that we modeled gestures using an LIP/NLIS representation, the following process was used to determine the appropriate model. For the first step, we created phase-plane plots of the gestures to be modeled, as illustrated in the last plot in FIG. 14. A term in a differential equation model was composed of a parameter associated with combinations of multiplied state variables of various powers, that is, of the form $\theta_i x_1^j x_2^k$. An example model (of a one dimensional motion is):

$$\dot{x}_1 = x_2$$

$$\dot{x}_2 = \theta_1 x_1 + \theta_2$$

Intuition was used to "guess" appropriate models that would best match the phase plane motions. Because we believed an acceleration model will sufficiently characterize the gestures in which we are interested, the $\dot{x}_2$ equation is the one modified with additional terms and parameters. For each model, the specific parameters for each gesture in the lexicon were computed using the LLS method.

The models were tested in simulation by measuring how well each tuned parameter model can predict the future states of its associated gesture (i.e., by computing a total residual error). The model which best discriminates between gestures was the chosen. If none of the models clearly discriminate between different gestures in a lexicon, then new models were tested. The heuristic we used was to add or delete specific terms, and determine if there was a significant change (good or bad) in the model's ability to discriminate gestures.

Adding two specific terms to the above equation, that is, using the new model $$\dot{x}_1 = x_2$$

$$\dot{x}_2 = \theta_1 x_1 + \theta_2 x_2 + \theta_3 x_2 x_1^2 + \theta_4$$

results in a model that is better able to discriminate between gestures.

The results of the process of modeling oscillating circles and lines are detailed in the remaining parts of this section. This process is also applicable to the determination of an appropriate model to classify certain non-linear gestures.

A variety of linear-in-parameter models for good circle and line gesture representations were tested. As before, each model represented only one dimension of motion, which was expanded to two or three for actually gesture recognition (i.e. an oscillating circle or line is formed when two or three of these decoupled models are present, one for each planar motion dimension). Again, $x_1$ is the position state, and $x_2$ is the velocity state. Five of these models are shown below. The determination of such models illustrates how a new (and more comprehensive model) could be determined when required for more complex dynamic motions.

To use the models described here on a digital computer, a fourth-order Runge-Kutta integration method was used. Simulations showed that a sampling rate of 10 Hz is sufficiently small to allow the use of this method. The linear-with-offset component model is the most basic second order linear system. The offset component allows the model to represent gestures that are offset from the center of the image plane. It contains two parameters and is of the form:

$\dot{x}_1 = x_2$ $\dot{x}_2 = \theta_1 x_1 + \theta_2$

The Van der Pol equation is a slightly non-linear system, containing three parameters. The $\theta_2$ and $\theta_3$ parameters are attached to damping terms. This system is of the form:

$\dot{x}_1 = x_2$ $\dot{x}_2 = \theta_1 x_1 + \theta_2 x_2 + \theta_3 x_2 x_1^2$ An offset component is added to the Van der Pol equation in this system. This system has four parameters and is of the form:

$\dot{x}_1 = x_2$ $\dot{x}_2 = \theta_1 x_1 + \theta_2 x_2 + \theta_3 x_2 x_1^2 + \theta_4$ A more non-linear system than the Van der Pol equations, the higher-order terms system contains additional spring-like components. This system has six parameters and is of the form:

$\dot{x}_1 = x_2$ $\dot{x}_2 = \theta_1 x_1 + \theta_2 x_1^2 + \theta_3 x_1^3 + \theta_4 x_2 + \theta_5 x_2 x_1^2 + \theta_6$ The Velocity Damping Terms system has additional damping terms. It contains eight parameters and is of the form:

$\dot{x}_1 = x_2$ $\dot{x}_2 = \theta_1 x_1 + \theta_2 x_1^2 + \theta_3 x_1^3 + \theta_4 x_2 + \theta_5 x_2 x_1^2 + \theta_6 x_2^3 + \theta_1^2 x_2^3 \theta_8$ The use of simulations to determine the best gesture model for representing oscillating circles and lines is now detailed. We first detail the residual measure calculation. Next the use of the residual measure to determine the best gesture model is described.

A predictor bin is composed of a model with parameters tuned to represent a specific gesture. The role of a bin is to determine a gesture's future position and velocity based on its current state. To measure the accuracy of the bin's prediction, we compared it to the next position and velocity of the gesture. The difference between the bin's prediction and the next gesture state is called the residual error. A bin predicting the future state of a gesture it represents will have a smaller residual error than a bin predicting the future state of a gesture it does not represent.

The computation for the residual error is based on equation:

$\dot{x}_k = F_k^T \theta$

Recall that f(x) is a two-dimensional vector representing the gesture's position and velocity. Therefore $\dot{x}_k$ is the gesture's velocity and acceleration at sample k. We compute $\dot{x}_k$ from the gesture's current and previous position and velocity. The parameter vector $\dot{\theta}$ is used to seed the predictor bin. Then:

$\dot{\hat{x}}_k = f_k^T \hat{\theta}$

The residual error is then defined as the normalized difference between the actual value of $\dot{x}_k$ and the calculated value of $\dot{\hat{x}}_k$:

$$\text{res\_err} = \frac{\|\dot{x}_k - \dot{\hat{x}}_k\|}{\|\dot{x}_k\|}$$

FIG. 20 illustrates this concept. Consider the gesture at a given velocity and acceleration, sample k. At sample k+1, the predictions from each bin and the actual velocity and acceleration values are shown. The difference between a bin's predicted values and the gesture's actual values (according to equation above) is the residual error for that particular bin.

The total residual error is the res_err summed for all data samples. The following section presents the residual calculation for each gesture with respect to each of the computed parameters.

We now detail how we determined which parameterization model for the predictor bin would best differentiate gestures. A data set of position and velocities of gestures is required to test each model. Using a vision system data was recorded for a slow, medium, and fast circular gesture. The data is the x and y position and velocity measurements from the image plane of the vision system, although for these simulations only one of the dimensions is used. There is a small transition time when a human begins a gesture. This transient is usually less than a second long, but the residual error measurement has no meaning during this time. Therefore, gestures that last at least five seconds are used. The data recorded from a human gesture is termed "real gesture data."

The total residual error was calculated by subjecting each predictor bin to each gesture type. A measure of a model's usefulness is determined by examining the ratio of the lowest residual error to the next lowest residual error in each column. The worst "residual error ratio" is the smallest ratio from all the columns because it is easier to classify a gesture when the ratio is large.

| | GESTURE INPUT | | |
|---|---|---|---|
| | SLOW | MEDIUM | FAST |
| Slow bin | 1.31 | 1.20 | 1.37 |
| Medium bin | 14.1 | 0.24 | 1.01 |
| Fast bin | 424 | 23.1 | 0.23 |

The residual error results of the linear with offset component are shown in the table above.

The residual errors for the slow and medium gestures, with respect to their associated bins, are an order of magnitude lower than the other errors in their columns. The residual error of the fast gesture, with respect to the fast gesture bin, is one-forth the size of the closest residual error in its column (the medium gesture bin). Therefore, the linear with offset component system is a good candidate for a gesture model.

| | GESTURE INPUT | | |
|---|---|---|---|
| | SLOW | MEDIUM | FAST |
| Slow bin | 1.34 | 1.26 | 1.38 |
| Medium bin | 9.8 | 0.56 | 1.17 |
| Fast bin | 36 | 1.79 | 0.1 |

As seen above, the Van der Pol model is only a fair candidate for gesture discrimination. The residual error of the medium gesture with respect to its gesture bin is only two-fifths smaller than the residual error with respect to the slow gesture bin. Also, the residual errors in the slow gesture column are not an order of magnitude apart.

| | GESTURE INPUT | | |
|---|---|---|---|
| | SLOW | MEDIUM | FAST |
| Slow bin | 1.3 | 1.21 | 1.37 |
| Medium bin | 14.5 | 0.22 | 0.98 |
| Fast bin | 464 | 25.7 | 0.11 |

The Van der Pol with offset component model is better at discriminating gestures than the model without the offset term (see table above). The residual errors in the medium gesture's column are now an order of magnitude apart. Although the residual errors in the fast gesture's column are not, the discrimination is still slightly better than in the linear with offset component model.

| | GESTURE INPUT | | |
|---|---|---|---|
| | SLOW | MEDIUM | FAST |
| Slow bin | 1.29 | 1.24 | 1.37 |
| Medium bin | 14.6 | 0.18 | 1.03 |
| Fast bin | 249 | 20.0 | 0.11 |

The table above shows the residual errors associated with the Higher Order model. This model is an improvement over the Van der Pol with Offset Component model, as the residual errors in the fast gesture's column are now almost an order of magnitude apart.

| | GESTURE INPUT | | |
|---|---|---|---|
| | SLOW | MEDIUM | FAST |
| Slow bin | 1.28 | 136 | 23.3 |
| Medium bin | 13.8 | 0.17 | 1 |
| Fast bin | 8770 | 35.9 | 0.09 |

The table above lists the residuals errors for the Velocity Damping model. This is the best model for discriminating between gestures, as the residual errors for each gesture with respect to their tuned bins are all at least an order of magnitude below the other residual errors in their columns.

A comparison of the worst "residual error ratio" of each model we considered is summarized in FIG. 21, and suggests that the Velocity Damping model is the best choice for our application. However, the technique described here shows how more models could be derived and tested. For simple dynamic gesture applications, the Linear with Offset Component model would be used. For more complex gestures, a variation of the Velocity Damping model would be used.

Combining One-Dimensional Motions to Form Higher-Dimensional Gestures

We have shown how predictors can be used to recognize one-dimensional oscillatory motions. Recognition of higher dimensional motions is achieved by independently recognizing multiple, simultaneously created one dimensional motions. For example, the combination of two oscillatory line motions performed in perpendicular axis can give rise to circular planar gestures, as shown in FIG. 22.

Humans have the ability to create these planar motions. However, they can also make these motions in all three dimensions (for example, circles generated around different axis). To recognize these planar gestures performed in three-dimensional space, a vision system must be able to track a gesture's position through all three physical dimensions. A binocular vision system has this capability, as does a monocular system with an attached laser range finder. Any of these such vision systems can be used with our gesture recognition system to identify three-dimensional gestures.

Development of a System to Recognize Static Gestures

Recognizing static hand gestures can be divided into localizing the hand from the rest of the image, describing the hand, and identifying that description. The module to recognize static hand gestures is to be both accurate and efficient. A time intensive process of evaluating hand gestures would prevent the system from updating and following motions which occur in real time. The system is intended to interact with people at a natural pace. Another important consideration is that the background may be cluttered with irrelevant objects. The algorithm should start at the hand and localize the hand from the surroundings.

In order to meet these demands, the edges of the image are found with a Sobel operator. This is a very fast linear operation which finds approximations to the vertical and horizontal derivatives. In order to use only a single image, the greater of the horizontal and vertical component is kept as the value for each pixel. Besides being quick to calculate, an edge image avoids problems arising from attempting to define a region by locating consistent intensity values or even consistent changes in intensity. These values can vary dramatically in one hand and can be very hard to distinguish from the background as well.

In order to describe the hand, a box which tightly encloses the hand is first found. This allows a consistent description which is tolerant to changes in scale. To locate this box, we assume a point within the hand is given as a starting point. This is reasonable because the hand will be the principal moving object in the scene. Moving objects may be easily separated and the center of the largest moving area will be in the hand. From this starting point, a prospective box edge is drawn. If this box edge intersects an existing line, it must be expanded. Each side is tested in a spiral pattern of increasing radius from the initial center point. Once three sides have ceased expanding the last side is halted as well. Otherwise, the last side would often crawl up the length of the arm. The bounding box is shown in FIG. 23.

Once the hand has been isolated with a bounding box, the hand is described (FIG. 24). This description is meant to be scale invariant as the size of the hand can vary in each camera image. At regular intervals along each edge the distance from the bounding edge to the hand's outline is measured. This provides a consistent description which may be rapidly calculated. A description is a vector of the measured distances, allowing a very concise representation.

The last task of the static gesture recognition is to identify the new description. A simple nearest neighbor metric is used to choose an identification. A file of recognized gestures is loaded in the initialization of the program. This file consists of a list of named gestures and their vector descriptions.

Considerations

The primary obstacle in static gesture recognition is locating and separating the hand from the surroundings. Using sophisticated models of the hand or human body to identify with an image are computationally expensive. If orientation and scale are not very constrained, this cannot be done in real time. Our system makes descriptions quickly and can compare them to predefined models quickly.

The limitations of the current system are a result of being dependent on the fast edge finding techniques. If lighting is highly directional, parts of the hand may be placed in shadow. This can cause odd, irregular lines to be found and defeat the normal description. If the background immediately surrounding the hand is cluttered with strongly contrasting areas, these unrelated lines may be grouped with the hand. This also causes unpredictable and unreliable descriptions. Such a background is very difficult to separate without making assumptions about the hand color or the size of the hand. An upper and lower bound are placed on the size of the hand in the image, but these permit a wide range of distances to the camera and are needed to assure that enough of the hand exists on image to make a reasonable description.

As long as the hand is within the size bounds (more than a speck of three pixels and less than the entire field of view) and the immediate surroundings are fairly uniform, any hand gesture may be quickly and reliably recognized.

Multiple camera views can be used to further refine the identification of static gestures. The best overall match from both views would be used to define and identify the static gestures. Furthermore, the system works not just for "hand" gestures, but for any static type of gestures, including foot, limb, and full body gestures.

The Overall Gesture Recognition System

In this section, based on the discussed functional and representational issues, we detail the specific components of a dynamic gesture recognition system according to the invention from an architectural and implementational viewpoint. In the preferred embodiment, the system is composed of five modules. FIG. 3 illustrates the signal flow of the gestural recognition and control system, from gesture creation, sensing, identification, and transformation into a system response.

Gesture Creator

In the Gesture Creator module, a human or device creates a spatial motion to be recognized by the sensor module. Our gesture recognition system was designed to recognize consistent yet non-perfect motion gestures and non-moving static gestures. Therefore, a human as well as a device can creates the gestures which can be recognizable by the system. Human gestures are more difficult to recognize due to the wide range of motions that humans recognize as the same gesture. We designed our gesture recognition system to recognize simple Lissagous gesture motions (repeating circles and lines), advanced motions such as "come here" and "go there", and static hand symbols (such as "thumbs-up").

Dynamic Gesture Lexicon

A gesture lexicon is a set of gestures used for communication or device control. We chose gestures for our lexicon based on the following:

Humans should be able to make the gestures easily.

Device gestures in the form of repeated motions should be modeled the same as human gestures.

The gestures should be easily represented as a dynamic system.

The lexicon should match useful gestures found in real world environments.

The dynamic gestures used in this system are preferably based upon three one-dimensional oscillations, performed simultaneously in three dimensions (or two oscillations performed in two dimensions). A circle is such a motion, created by combining repeating motions in two dimensions that have the same magnitude and frequency of oscillation, but with the individual motions ninety degrees out of phase. A "diagonal" line is another such motion. To illustrate this, we define three distinct circular gestures in terms of their frequency rates: slow, medium, and fast. Humans create gestures that we define as slow large circles (slow), fast large circles (medium), and fast small circles (fast). More complex gestures can be generated and recognized, but these simple ones are used for illustrative purposes.

Main Three Gestures

Using the simpler Linear with Offset model (whose parameters are easier to understand than the more complex models), we represented a circle by two second order equations, one for each axis:

$$\dot{x}_1 = x_2$$

$$\dot{x}_2 = \theta_1 x_1 + \theta_2$$

and $$\dot{y}_1 = y_2$$

$$\dot{y}_2 = \theta_1 y_1 + y_2$$

The preferred gesture model has no "size" parameter. $\theta_1$ is a frequency measure, and $\theta_2$ is a drift component. The gestures were named "large", "small", "fast", and "slow" due to the human motions used to determine the parameters (see FIG. 25). A fast small circle is used to represent a fast oscillation because humans cannot make fast oscillations using large circles. Models with higher order terms would have parameters with different representations.

Expanded Lexicon-Geometric Constraints

A total of twenty-four gestures are possible from this example representation when the following are distinct gestures: clockwise and counter-clockwise circles, diagonal lines, one dimensional lines, and small and large circles and lines. Geometric constraints are required to expand the lexicon, because different gestures can result in the same parameters. FIG. 4 shows motions that would cause an identifier to produce the same frequency measure and drift components as it would produce when identifying a slow large circle. When x and y oscillating motions are 90 degrees out of phase, a clockwise circle is produced. Motions that are 270 degrees out of phase result in a counter clockwise circle. In phase motions produce a line with a positive slope. When the motions are 180 degrees out of phase, a line with a negative slope is produced. We can create additional gestures from the fast small circle in the same manner.

Given the various combinations of slow, fast, small, and large circles, the only one not used as a gesture is the slow small circle. Since the slow small circle has the same oscillation frequency (medium) as the fast large circle, we need another geometric feature, the circle's size, to differentiate between these two gestures. As with the previous gestures, additional gestures can be created from these two gestures by varying the phase relationships. FIG. 6 shows a representation of the 24 gestures in this example lexicon.

Phase relationships are determined as follows. During the gesture, the x's and y's minimum and maximum image plane positions are computed. If the x and y motions are out of phase, as in a circle, then when x or y is minimum or maximum, the other axis's velocity is large. The clockwiseness of the motion is determined by looking at the sign of this velocity component. Similarly, if the x and y motion are in phase, then at these extremum points both velocities are small. A similar method is used when the gesture is performed in three dimensions.

Sensor Module

Unmodified Cohu solid-state CCD cameras are used as the sensor devices. No filters were used and the background was not modified. A Matrox Meteor capture card was used to scale a captured image to any size without missing any frames. It will capture and transfer full-resolution, full-frame NTSC (640×480) or PAL (768×576) video input in real-time (30 Hz).

The color tracking system (CTS) uses the color of the hand and its motion to localize the hand in the scene, as shown schematically in FIG. 26. The hardware of the CTS system consists of a color camera, a frame grabber, and an IBM-PC compatible computer. The software consists of the image grabbing software and the tracking algorithm. Once the CTS is running, the graphical user interface displays the live image from the color camera on the computer monitor. The operator can then use the mouse to click on the hand in the image to select a target for tracking. The system will then keep track of the moving target in the scene in real-time.

The color tracking system is developed on a BSD 4.0 UNIX operating system. The hardware involved consists of a color camera, an image capture board and an IBM PC compatible. The software for the CTS is written in C and uses Motif for its graphical user interface.

The present HTS system consists of a COHU 1322 color camera with a resolution of 494×768 pixels. The camera is connected to a Meteor image capturing board situated inside a Pentium-II 450 MHz IBM-PC compatible computer. The Meteor board is capable of capturing color video images at 30 frames per second. It is also able to capture these images at any resolution below the resolution of the camera.

The graphical user interface for the CTS displays a live color image from the camera on the computer screen. The user can then identify the target in the scene and click on it using the mouse. The CTS will then track the target in real-time. The flow chart of the tracking algorithm is shown in FIG. 27.

We capture the image using functions from the Meteor driver. To provide real-time operation, we setup the board to signal the program using a system interrupt (SIGUSR2). Every time a new frame is ready, the Meteor alerts the program with an interrupt on this signal. The image capture function responds to the interrupt by transferring the current camera image to a buffer and processing it to find the target. The signal mechanism and its handling are what enable the system to operate in real-time.

The graphical user interface of CTS displays the live camera image on the screen. The user can start tracking by clicking the mouse on the target. This starts the tracking algorithm. The graphical user interface of the CTS is shown in FIG. 28.

Once the user clicks on the target in the image, we compute the average color of a small region around this point in the image. This will be the color of the target region being tracked in the scene until it is reinitialized. Once tracking begins, we compute the position of the target region in the image using two methods. The first method tracks the target when there is sufficient motion of the target in the image. The second method will take over when there is no motion of the target in the scene.

Before choosing the methods for finding the target in the scene, the system checks for motion in a region near the current or estimated target position using a motion detecting function. This function computes the difference between the current image and the previous image, which is stored in memory. If motion has occurred there will be sufficient change in the intensities in the region. This will indicate motion. The motion detection function will trigger if a sufficient number of pixels change intensity by a certain threshold value.

If the motion detection function detects motion, the next step is to locate the target. This is done using the difference image and the target color. When an object moves between frames in a relatively stationary background, the color of the pixels changes between frames near the target (unless the target and the background are of the same color). We compute the color change between frames for pixels near the target location. The pixels whose color changes beyond a threshold make up the difference image. Note that the difference image will have areas, which are complementary. The pixels where the object used to be will complement those pixels where the object is at now. If we separate these pixels using the color of the target, we can compute the new location of the target. The set of pixels in the difference image, which has the color of the target in the new image, will correspond to the leading edge of the target in the new image. If we assume that the target approximates an ellipse of known dimensions, we can compute the position of the center of the target (ellipse) from this difference image (see FIG. 29).

The color of a pixel in a color image is determined by the values of the Red, Green and Blue bytes corresponding to the pixel in the image buffer. This color value will form a point in the three-dimensional RGB color space (see FIG. 30). For our tracking system, when we compute the average color of the target, we assume that the target is fairly evenly colored and the illumination stays relatively the same. The average color of the target is then the average RGB values of a sample set of pixels constituting the target. When the target moves and the illumination changes the color of the target is likely to change. The color matching function allows us to compute whether a pixel color matches the target color within limits. When the illumination on the target changes, the intensity of the color will change. This will appear as a movement along the RGB color vector as shown in FIG. 30. In order to account for slight variations in the color, we further allow the point in color space to lie within a small-truncated cone as shown in the figure. Two thresholds will decide the shape of the cone. One for the angle of the cone and one for the minimum length of the color vector. Thus, any pixel whose color lies within the truncated cone in color space will be considered as having the same color as the target.

When the motion detection function fails to detect significant motion in the scene, we use a static target matching function to compute its location. The function searches a small area about the current location of the target to find the best fit in the image for the target. The search will find the location of the target with the highest matching value. We assume that the object is approximately elliptical. The elliptical target is hypothesized at each point in the search space and the matching metric is computed. This matching metric function uses a combination of edge and interior color matching algorithms to get a single matching number.

The image capture board is capable of providing us with a 480×640-pixel color image at 30 frames per second. Processing such a large image will slow down the program. Fortunately, the nature of the tracking task is such that, only a fraction of the image is of interest. This region called the window of interest lies around the estimated position of the target in the new image. We can compute the location of the target in the new image from the location of the target in the previous image and its velocity. This simple method is able to keep track of the target even when the target moves rapidly. We have found that the window of interest is typically $\frac{1}{100}^{th}$ the area of the original image. This speeds up the computation of the new target location considerably. A computer with a higher processing speed could process the entire image without resorting to creating a region of interest.

Identification Module

The gesture recognition algorithms are located in the Identification Module. This module uses the position and velocity information provided by the sensor module to identify the gesture. The module, shown in FIG. 31, comprises of three components—the Dynamic Gesture Prediction module, the Static Gesture Identification module, and the Overall Determination module (Which Gesture?). The output of the Overall Determination module is sent to a screen display and to the SSM which produces an output based on the gesture command received.

The Dynamic Gesture Prediction Module

The Dynamic Gesture Prediction module contains a bank of predictor bins (see FIG. 32). Each predictor bin contains a dynamic system model with parameters preset to a specific gesture. We assumed that the motions of human circular gestures are decoupled in x and y. Therefore, there are separate predictor bins for the x and y axes. In this example of three basic two dimensional gestures, a total of six predictor bins are required. The position and velocity information from the sensor module is fed directly into each bin.

The idea for seeding each bin with different parameters was inspired by Narendra and Balakrishnan's work on improving the transient response of adaptive control system. In this work, they create a bank of indirect controllers which are tuned on line but whose identification models have different initial estimates of the plant parameters. When the plant is identified, the bin that best matches that identification supplies a required control strategy for the system.

Each bin's model, which has parameters that tune it to a specific gesture, is used to predict the future position and velocity of the motion. This prediction is made by feeding the current state of the motion into the gesture model. This prediction is compared to the next position and velocity, and a residual error is computed. The bin, for each axis, with the least residual error is the best gesture match. If the best gesture match is not below a predefined threshold (which is a measure of how much variation from a specific gesture is allowed), then the result is ignored; no gesture is identified. Otherwise, geometric information is used to constrain the gesture further. A single gesture identification number, which represents the combination of the best x bin, the best y bin, and the geometric information, is outputted to the transformation module. This number (or NULL if no gesture is identified) is outputted immediately upon the initiation of the gesture and is continually updated.

Determining Parameter Values

The parameters used to initially seed each predictor bin were calculated by feeding the data of each axis from the three example basic gestures into the recursive linear least squares. The values for each bin are summarized in the following Table:

| | Parameter Values | | | |
| --- | --- | --- | --- | --- |
| | x-theta-1 | x-theta-2 | y-theta-1 | y-theta-2 |
| slow bin | −0.72 | 149 | −0.73 | 103 |
| medium bin | −16.2 | 3467 | −16.3 | 2348 |
| fast bin | −99.3 | 20384 | −97.1 | 12970 |

The Static Gesture Identification Module

The Static Gesture Identification module only searches for static gestures when the hand motion is very slow (i.e. the norm of the x and y velocities is below a threshold amount). When this happens, the module continually identifies a static gesture or outputs that no gesture was found.

The static gestures may be easily expanded by writing new gesture descriptions to a configuration file. Each gesture is described by a name tag, width, height, x location, y location, base side, and three vectors (in this example, each consisting of 15 integers) describing the profile of the hand. Because profiles may be significantly different due to varying tilts of the hand, multiple descriptions of fundamentally the same gesture may be desired. The initial or last line may also be less reliable due to missing the contours of the hand edge image.

Example parameter files are depicted in the following table:

```
Parameters for Halt
name: halt arm: 14 width: 32 height: 47 xloc: −1 yloc: −1
4 4 0 0 0 0 0 0 0 0 0 6 8 10
9 8 8 7 4 3 3 3 2 2 1 1 1 1 2
17 17 16 12 11 10 10 9 8 1 1 2 4 6 9
Parameters for Turn Right
name: go_right arm: 11 width: 47 height: 31 xloc: −1 yloc: 0
47 27 26 23 8 5 1 1 1 23 4 19 12 14 21
31 11 9 7 10 10 9 10 5 2 1 5 8 10 13
31 14 10 10 6 5 4 3 2 3 2 1 1 1 2
Parameters for Acknowledge
name: acknowledge arm: 11 width: 38 height: 46 xloc: 0 yloc: 0
38 6 6 8 11 12 10 3 2 1 3 3 9 6 12
46 23 20 3 1 4 7 2 13 16 17 19 21 22 24
46 17 11 2 1 1 2 2 7 3 3 3 4 7 7
Parameters for Freeze (fist)
name: freeze arm: 14 width: 27 height: 29 xloc: −1 yloc: −1
0 0 0 4 6 6 3 2 2 2 3 6 7 0 8
27 12 12 4 4 3 3 3 2 2 2 1 1 1 1
27 14 14 13 13 13 4 2 2 2 3 3 1 2 3
```

In each the name string is followed by an arm side, width, height, x location and y location. The arm parameter is simply an integer corresponding to above, below, right, or left. The width and height are measured in pixels. The x and y location are 0 if the location is not important or +1 or −1 to restrict recognition of a gesture to one particular quadrant. The following three vectors are the extreme side (the end of the hand) then the top or left side followed by the bottom or right side. The determination of which side is being represented is determined by the arm side parameter. For example, if the base side is from below (as in the Halt gesture below) the first line is from above, then from the left, then from the right. Right and left refer to the overall image—not the facing of the imaged person.

Another method used for this part is to parameterize each part of the hand (palm, digits, and wrist) as a set of connected "blobs", that is, three-dimensional shapes which are connected together geometrically. As before, a configuration file would be used to defile how these blobs are connected, with the vision system identifying the blobs which this module sticks together.

The Overall Determination Module

This "Which Gesture?" module takes input from both the Static and Dynamic Gesture modules. When the velocity is small, then a static gesture is observed. When the velocity is greater than a threshold value, then a dynamic gesture is observed. The gesture identified is continuously outputted, and can therefore change value over time (the output can even be that no gesture was identified). The gesture identified is sent to the transformation module.

Transformation Module

The transformation module takes a gesture type as its input and determines what to do with it. In the case of this system, the gesture is converted to parameters which represent the static or dynamic gesture, which is sent to the system which uses this information to produce a response.

System Response

The gesture command can be used for a wide variety of purposes. These include:

Commands into a virtual reality simulator, to control and interact with the environment.

Commands for a self service machine (SSM), such as a public information kiosk or Automated Teller Machines.

Commands to control an actuated mechanism, such as a robot arm or mobile robot.

Commands to control any device (such as a home appliance).

It is important to note that these devices can be controlled using static gestures, dynamic gestures, or a combination of the two. Thus, there is more information available to these systems from the gesture input device, thereby allowing for a greater ability for humans to command and control them.

The key features of our architecture are the prediction modules and the signal flow from gesture creation to system response. The other modules could be replaced with functionally equivalent systems without changing the structure of our architecture. For example, instead of a human, a robot could create the gesture. Alternatively, one could create the gesture using a stylus, with a graphics tablet replacing the vision system in sensor module S. The graphics tablet would output the x and y coordinates to the identification module I. Similarly, module R could be a robot, one as complex as a six degree of freedom robot arm or as simple as a stepper motor based camera platform. The former mechanism requires a more complex transformation scheme in module T, while the latter system needs only a simple high level command generator.

As discussed earlier, the static and dynamic identification modules contains the majority of the required processing. Compared to most of the systems developed for gesture recognition, this system requires relatively little processing time and memory to identify one gesture feature. This makes it possible to create a system with the ability to identify multiple features in parallel. A sophisticated module could then examine the parallel gesture features and infer some higher level motion or command.

This invention finds wide utility in a large number of application areas, including map control, home automation, security, home appliances, sports, games, business, automotive, and others, some of which have been mentioned herein above.

In terms of map control, the maps may be associated with weather, military, automotive (i.e., GPS-based or other navigation systems), nautical, aerial, space, security, and telestrator interactions and control. As one more specific application, a meteorologist may control the generation, selection, presentation or movement of weather maps, satellite views, and other visuals through gesture recognition according to the invention.

In terms of home automation, gesture control according to the invention may be used to control one or more of the following:

Lights
Doors
Computers
Robotic pets and associated applications
Security
Garage Doors
Plumbing
Environmental controls (HVAC)
Curtains
Windows
Automatic pet/human exit/entry
Baby monitoring
Pool monitoring
Alarm clock
Gesture clapper The control of home appliances includes:
TV/Video
VCS/DVD/Tivo
Stereo
Vacuum Sports applications include:
Training (form, golf swing, batting swing, etc.)
Richard SIM (interactive personal training)
Automatic score keeping
Automatic refereeing
Personal training and fitness—monitoring and interaction Gesture control according to the invention may be used to control:
Sword fighting games
Fighting games
Action games
Adventure games
Role playing games
Car racing
Concole control
PC control
Handheld control
Arcade control
Augmented Reality Systems
    Theme part game/interactions
    Interacting with virtual entities
    Interacting in a virtual environment
    Decision Aids Business and Automotive Applications include:
Presentation Training and Control
Powerpoint control
Presentation control
Automotive Map control
Radio tuning/volume and other controls Power Windows
Cruise control
Bright light tracking to reduce intensity
Vehicular motion/behavior tracking
Robotic control include
Direct commands
Intent control
Interaction with others doing gestures
Commercial gesture control applications according to the invention include:
Aviation Runway Control
Crane Control
Aircraft Vectoring
Helicopter
Animal tracking for zoo/park services
Safety—tracking of people and objects.
    Ex: tracking deer/animals/humans as the approach a highway
    Ex: weapons not firing when vision systems recognize surrender or other gestures
Optimization, including the tracking of people and objects may involve:
Crowd control
Automatic product ordering
Shopping
Restaurants
Virtual catalogues at malls and stores
Control of surgical tools
Criminal monitoring Miscellaneous applications include:
Dynamics based missile tracking
Lifeguard aid: identify when people are in danger in the water.
Action interpreting for the handicap
Alternative control for disabled Furthermore, in addition to the modalities described above, gesture capture may occur through vision systems, accelerometers, inertial systems, radio frequency, acoustic tracking, and mechanical linkages.

We claim:

1. A gesture-controlled interface for map manipulation, comprising:

a sensor module for visually analyzing a gesture made by a human or machine, and outputting image data including position and velocity information associated with the gesture;

an identification module operative to identify the gesture based upon the image data output by the sensor module;

a transformation module operative to generate a command based upon the gesture identified by the identification module; and a system response module operative to apply to the command from the transformation module to generate, select, present, or move a map.

2. The interface of claim 1, wherein the map is a weather map.

* * * * *